United States Patent
Grandidge et al.

(10) Patent No.: US 9,784,936 B2
(45) Date of Patent: Oct. 10, 2017

(54) MEDIA PATCHING SYSTEM WITH DOOR ASSEMBLY

(71) Applicant: Ortronics, Inc., New London, CT (US)

(72) Inventors: Ryan J. Grandidge, Westerly, RI (US); Rudolph A. Montgelas, West Hartford, CT (US)

(73) Assignee: Ortronics, Inc., New London, CT (US)

( * ) Notice: Subject to any disclaimer, the term of this patent is extended or adjusted under 35 U.S.C. 154(b) by 71 days.

(21) Appl. No.: 14/742,359

(22) Filed: Jun. 17, 2015

(65) Prior Publication Data

US 2015/0362689 A1   Dec. 17, 2015

Related U.S. Application Data

(63) Continuation-in-part of application No. 14/683,433, filed on Apr. 10, 2015, now Pat. No. 9,606,317, and
(Continued)

(51) Int. Cl.
| | |
|---|---|
| *G02B 6/44* | (2006.01) |
| *G07C 9/00* | (2006.01) |
| *H04Q 1/02* | (2006.01) |

(52) U.S. Cl.
CPC ....... *G02B 6/4452* (2013.01); *G07C 9/00896* (2013.01); *H04Q 1/13* (2013.01)

(58) Field of Classification Search
CPC .. G02B 6/4452; G02B 6/4453; G02B 6/4439; G02B 6/4455; G02B 6/3897; G07C 9/00896; H04Q 1/06
(Continued)

(56) References Cited

U.S. PATENT DOCUMENTS

| 5,142,607 | A | * | 8/1992 | Petrotta | G02B 6/444 385/135 |
| 5,945,633 | A | * | 8/1999 | Ott | G02B 6/4452 174/59 |

(Continued)

OTHER PUBLICATIONS

U.S. Appl. No. 14/683,433, filed Apr. 10, 2015.
(Continued)

*Primary Examiner* — Anita M King
(74) *Attorney, Agent, or Firm* — McCarter & English, LLP

(57) ABSTRACT

Improved media patching systems and related methods of use are provided. The present disclosure provides improved systems/methods for the design and use of patching systems configured to support multiple media connections (e.g., high density, mixed media connections). The present disclosure provides advantageous systems/methods for the design and use of patching systems having one or more bracket members (e.g., Z-shaped bracket members) configured to facilitate cable management. In exemplary embodiments, the bracket members allow a panel assembly to move relative to the bracket members for cable management purposes. The improved systems/assemblies of the present disclosure provide users with the ability to install multiple media connections (e.g., copper-based and/or fiber optic connections) in the same patching system/enclosure. The present disclosure also provides media patching systems having a door assembly (e.g., mounted with respect to bracket members) that is configured to open, close, lock and unlock as desired by a user.

18 Claims, 32 Drawing Sheets

Related U.S. Application Data a continuation-in-part of application No. 14/683,503, filed on Apr. 10, 2015, and a continuation-in-part of application No. 14/683,569, filed on Apr. 10, 2015, and a continuation-in-part of application No. 14/683,723, filed on Apr. 10, 2015, now Pat. No. 9,632,271, and a continuation-in-part of application No. 14/683,786, filed on Apr. 10, 2015, now Pat. No. 9,606,318.

(60) Provisional application No. 62/013,079, filed on Jun. 17, 2014.

(58) Field of Classification Search
USPC .............. 248/68.1; 385/135, 134, 136; 361/725–727
See application file for complete search history.

(56) References Cited

U.S. PATENT DOCUMENTS

| | | | |
|---|---|---|---|
| 6,968,647 B2 | 11/2005 | Levesque et al. | |
| 7,225,586 B2 | 6/2007 | Levesque et al. | |
| 7,697,811 B2 | 4/2010 | Murano et al. | |
| 7,764,859 B2 * | 7/2010 | Krampotich | G02B 6/4452 385/135 |
| 7,983,038 B2 | 7/2011 | Levesque et al. | |
| 8,106,311 B2 | 1/2012 | Larsen et al. | |
| 8,130,494 B2 | 3/2012 | Larsen et al. | |
| 8,184,938 B2 | 5/2012 | Cooke et al. | |
| 8,398,039 B2 | 3/2013 | Murano et al. | |
| 8,439,702 B2 | 5/2013 | Dietz et al. | |
| 8,452,148 B2 * | 5/2013 | Cooke | G02B 6/4452 385/135 |
| 8,457,464 B2 * | 6/2013 | O'Connor | G02B 6/4452 385/134 |
| 8,526,181 B2 | 9/2013 | Levesque et al. | |
| 8,538,226 B2 * | 9/2013 | Makrides-Saravanos | G02B 6/4455 385/135 |
| 8,672,709 B2 | 3/2014 | Dietz et al. | |
| 8,731,364 B2 | 5/2014 | Murano et al. | |
| 8,758,047 B2 | 6/2014 | Dietz et al. | |
| 8,834,199 B2 * | 9/2014 | Foung | H01R 13/518 439/540.1 |
| 9,423,585 B2 * | 8/2016 | Timmins | G02B 6/4452 |
| 9,606,317 B2 * | 3/2017 | Grandidge | G02B 6/4452 |
| 9,606,318 B2 * | 3/2017 | Grandidge | G02B 6/4452 |
| 2008/0025683 A1 * | 1/2008 | Murano | G02B 6/4453 385/135 |
| 2009/0129014 A1 | 5/2009 | Larsen et al. | |
| 2014/0206273 A1 | 7/2014 | Larsen et al. | |
| 2015/0366092 A1 * | 12/2015 | Grandidge | G02B 6/4452 312/223.6 |

OTHER PUBLICATIONS

U.S. Appl. No. 14/683,503, filed Apr. 10, 2015.
U.S. Appl. No. 14/683,569, filed Apr. 10, 2015.
U.S. Appl. No. 14/683,723, filed Apr. 10, 2015.
U.S. Appl. No. 14/683,786, filed Apr. 10, 2015.
U.S. Appl. No. 62/013,079, filed Jun. 17, 2014.
U.S. Appl. No. 14/304,079, filed Jun. 13, 2014.

* cited by examiner

MEDIA PATCHING SYSTEM WITH DOOR ASSEMBLY

CROSS-REFERENCE TO RELATED APPLICATIONS

This application claims the benefit of U.S. Provisional Application No. 62/013,079 filed Jun. 17, 2014, which is hereby incorporated by reference in its entirety. This application is a continuation-in-part of U.S. patent application Ser. No. 14/683,433, filed Apr. 10, 2015 and titled "Media Patching System," which is hereby incorporated by reference in its entirety. This application is also a continuation-in-part of U.S. patent application Ser. No. 14/683,503, filed Apr. 10, 2015 and titled "Modular Cable Management Spools," which is hereby reference in its entirety. This application is also a continuation-in-part of U.S. patent application Ser. No. 14/683,569, filed Apr. 10, 2015 and titled "Patch Panel Assembly for Media Patching Systems," which is hereby incorporated by reference in its entirety. This application is also a continuation-in-part of U.S. patent application Ser. No. 14/683,723, filed Apr. 10, 2015 and titled "Modularly Mountable Cable Management Systems," all of which is herein incorporated by reference in its entirety. This application is also a continuation-in-part of U.S. patent application Ser. No. 14/683,786, filed Apr. 10, 2015 and titled "Cable Management Plate Assembly and Associated Systems and Methods," which is hereby incorporated by reference in its entirety.

FIELD OF THE DISCLOSURE

The present disclosure relates to patching systems configured to support multiple media connections (e.g., high density, mixed media connections) and, more particularly, to media patching systems having a door assembly (e.g., mounted with respect to bracket members) that is configured to open, close, lock and unlock as desired by a user.

BACKGROUND OF THE DISCLOSURE

In general, devices for interfacing with high frequency data transfer media are known. See, e.g., U.S. Pat. Nos. 8,439,702; 8,672,709 and 8,731,364, the entire contents of each being hereby incorporated by reference in their entireties.

For example, connectors or jack assemblies having a plurality of contacts (e.g., modular communication jacks) have been developed that facilitate communication with contacts in connecting assemblies (e.g., plug connectors), that in turn interact with various media (e.g., copper-based media such as unshielded twisted pair (UTP) media, fiber optic cables, etc.). The jack assembly contacts are typically positioned for communication with data signal transmission media plug elements/contacts introduced to a receiving space of the jack assembly.

In general, many data transfer media includes multiple pairs of lines bundled together. Communications systems typically incorporate such media (e.g., UTP media, fiber optic cables, etc.) and connectors (e.g., jack/plug combinations) for data transfer. For example, a plurality of jack assemblies/housings may be positioned adjacent one another in a multi-gang jack panel or the like, with each jack assembly/housing releasably secured and/or attached to the jack panel or the like.

In general, commercial buildings require an effective and efficient telecommunications infrastructure to support the wide variety of services that rely on the transport of information. Typically, wiring systems within buildings are terminated at a location where they may be interconnected with one another, and/or to other cabling systems or telecommunications equipment. Cables are often terminated on wire panels or patch panels or the like, which can be mounted to racks or to some other location/structure.

Patch panels are known in the field of data communication systems. See, e.g., U.S. Pat. No. 8,106,311, the entire contents of which is hereby incorporated by reference in its entirety. Some other exemplary assemblies/systems in this general field are described and disclosed in U.S. Pat. Nos. 7,697,811; 7,983,038; 8,184,938; 8,398,039; and U.S. Patent Pub. Nos. 2012/0064760 and 2013/0129296, the entire contents of each being hereby incorporated by reference in their entireties.

A patch panel generally provides a plurality of network ports incorporated into a structural element that connect incoming and outgoing lines of a communication/electrical system (e.g., a local area network (LAN) or the like). Typical patch panels are mounted hardware units that include a plurality of port locations, and utilize cables for interconnections. A patch panel can use patch cords to create the interconnections. Patch panel systems are generally intended to facilitate organization and management in implementing telecommunications wiring systems (e.g., for high speed data networks).

In general, many rows of cabinets or racks typically fill a data center or telecommunications room. Patch panels affixed to a rack and/or a telecommunications room provide convenient access to telecommunication devices (e.g., servers) within the rack or room. As the demand for the use of telecommunication devices rapidly grows, space for such devices becomes limited and/or expensive.

A constant need exists among manufacturers to develop patch panel assemblies/patching systems or the like that include improved features and structures.

Thus, an interest exists for improved patch panel assemblies/patching systems and related methods of use. These and other inefficiencies and opportunities for improvement are addressed and/or overcome by the assemblies, systems and methods of the present disclosure.

SUMMARY OF THE DISCLOSURE

The present disclosure provides advantageous media patching systems, and improved methods for using the same. The present disclosure provides advantageous patching systems configured to support multiple media connections (e.g., high density, mixed media connections), and related methods of use.

More particularly, the present disclosure provides improved systems/methods for the design and use of media patching systems having one or more bracket members (e.g., Z-shaped bracket members) configured to facilitate cable management. In exemplary embodiments, the bracket members allow a panel assembly to move relative to the bracket members (e.g., for cable management purposes). The present disclosure also provides media patching systems having a door assembly (e.g., mounted with respect to bracket members) that is configured to open, close, lock and unlock as desired by a user.

In certain embodiments, disclosed herein is a high density patching system configured to support multiple media connections. The improved systems of the present disclosure provide users with the ability to install multiple media connections (e.g., copper-based and/or fiber optic connections) in the same patching system/enclosure. For example, high density jack patch panels can be utilized in the systems of the present disclosure to support multiple media connections (e.g., high density media connections, such as copper and/or fiber optic connections). Exemplary patch panel assemblies disclosed herein can advantageously increase the patching density of the systems of the present disclosure, and provide improved access to the media connectors and cabling elements.

The present disclosure provides for a media management system including a first bracket member and a second bracket member, the first bracket member configured to releasably mount to a first cable management member and the second bracket member configured to releasably mount to a second cable management member, the first and second cable management members configured to manage media cables; and a door assembly having a frame extending from a first end to a second end, the first end configured to releasably mount to the first cable management member, and the second end configured to releasably mount to the second cable management member; wherein the releasably mounted first and second ends allow the door assembly to move relative to the first and second bracket members between a closed position and an open position and vice-versa.

The present disclosure also provides for a media management system wherein the first end of the frame includes a first hinge pin, the first hinge pin configured to be releasably mounted to a first bottom extension member of the first cable management member; and wherein the second end of the frame includes a second hinge pin, the second hinge pin configured to be releasably mounted to a second bottom extension member of the second cable management member.

The present disclosure also provides for a media management system wherein the first hinge pin is configured to be rotatably mounted to a first hinge portion of the first bottom extension member, and the second hinge pin is configured to be rotatably mounted to a second hinge portion of the second bottom extension member. The present disclosure also provides for a media management system wherein the first hinge pin is positioned within a first groove of the first end of the frame, and second hinge pin is positioned within a second groove of the second end of the frame.

The present disclosure also provides for a media management system wherein the first hinge pin includes a first spring portion that is configured to be compressed by a user to retract and release the first hinge pin from the first bottom extension member; and wherein the second hinge pin includes a second spring portion that is configured to be compressed by a user to retract and release the second hinge pin from the second bottom extension member.

The present disclosure also provides for a media management system wherein the frame includes a wire that extends from a first end to a second end, the first end of the wire mounted to a first spring-loaded pin mechanism and the second end of the wire mounted to a second spring-loaded pin mechanism; and wherein the first spring-loaded pin mechanism includes a first pin configured to be releasably mounted to a first top extension member of the first cable management member, and the second spring-loaded pin mechanism includes a second pin configured to be releasably mounted to a second top extension member of the second cable management member.

The present disclosure also provides for a media management system wherein the first pin is configured to be releasably mounted to a first locking portion of the first top extension member, and the second pin is configured to be releasably mounted to a second locking portion of the second top extension member. The present disclosure also provides for a media management system wherein the first end of the wire includes a first loop that is mounted to a slot or hole of the first pin, and the second end of the wire includes a second loop that is mounted to a slot or hole of the second pin.

The present disclosure also provides for a media management system wherein the first spring-loaded pin mechanism includes a first spring that is configured to be compressed by a user to retract and release the first pin from the first top extension member; and wherein the second spring-loaded pin mechanism includes a second spring that is configured to be compressed by a user to retract and release the second pin from the second top extension member. The present disclosure also provides for a media management system wherein the first spring surrounds a portion of the first pin, and the second spring surrounds a portion of the second pin.

The present disclosure also provides for a media management system wherein the door assembly includes a latch configured to be releasably and movably mounted to the frame, the latch including a groove that houses a portion of the wire; and wherein when the latch is moved upwardly by a user, this movement causes the wire to compress the first and second springs and also retract and release the first and second pins from the first and second top extension members, respectively.

The present disclosure also provides for a media management system wherein the latch includes a hinge pin configured to be positioned within a mounting groove of the frame to releasably and movably mount the latch to the frame.

The present disclosure also provides for a media management system wherein the wire is fabricated from a shape-memory alloy, the wire configured to contract when an electrical current passes through the wire and return back to original length when the current ceases to flow through the wire.

The present disclosure also provides for a media management system wherein when the wire contracts when an electrical current passes through the wire, this contraction causes the wire to compress the first and second springs and also retract and release the first and second pins from the first and second top extension members, respectively.

The present disclosure also provides for a media management system wherein a key electrically connected to the frame is configured to cause an electrical current to pass through the wire.

The present disclosure also provides for a media management system wherein the key includes a first circuit board, a microprocessor and a first dual inline package switch; wherein the frame includes a second circuit board, a second dual inline package switch and at least one circuit wire connected to the second circuit board and electrically connected to the wire; and wherein when the key is mounted to the frame, the microprocessor of the key determines if there is a code match between the first and second dual inline package switches and then enables current flow to the wire if the first and second dual inline package switches match.

The present disclosure also provides for a media management system wherein the first and second dual inline package switches each include four individual on-off switches. The present disclosure also provides for a media management system wherein the key is connected to the frame via a USB receptacle.

The present disclosure also provides for a media patching system including a panel assembly having a front panel segment, the front panel segment having a plurality of apertures with each aperture configured to mount to a media connector assembly; a first bracket member and a second bracket member, the first bracket member configured to releasably mount to a first cable management member and the second bracket member configured to releasably mount to a second cable management member, the first and second cable management members configured to manage media cables; a door assembly having a frame extending from a first end to a second end, the first end configured to releasably mount to the first cable management member, and the second end configured to releasably mount to the second cable management member; wherein the releasably mounted first and second ends allow the door assembly to move relative to the first and second bracket members between a closed position and an open position and vice-versa; and wherein the panel assembly is movably mounted to the first and second bracket members and can move axially forwards or backwards relative to the first and second bracket members.

The present disclosure also provides for a media management system including a first bracket member and a second bracket member; a first cable management member and a second cable management member, the first and second cable management members configured to manage media cables; a door assembly having a frame extending from a first end to a second end; means for releasably mounting: (i) the first cable management member to the first bracket member, and (ii) the second cable management member to the second bracket member; and means for releasably mounting: (i) the first end of the frame to the first cable management member, and (ii) the second end of the frame to the second cable management member; wherein the releasably mounted first and second ends allow the door assembly to move relative to the first and second bracket members between a closed position and an open position and vice-versa.

Any combination or permutation of embodiments is envisioned. Additional advantageous features, functions and applications of the disclosed systems, methods and assemblies of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein.

DETAILED DESCRIPTION OF DISCLOSURE

Figure 1:
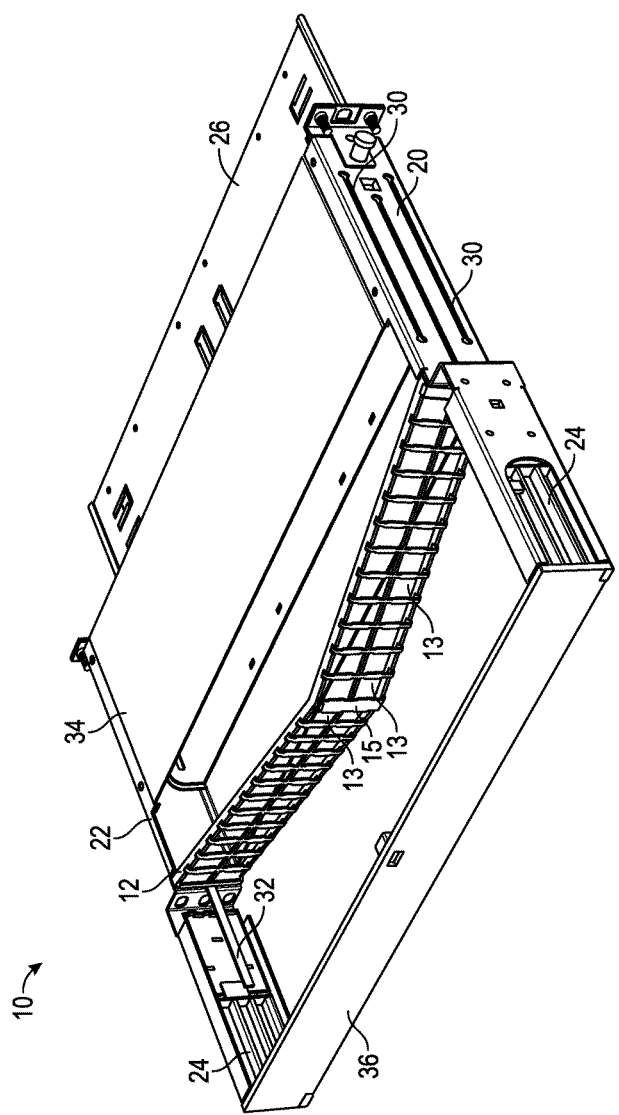
FIG. 1 is a top perspective view of a media patching system according to an exemplary embodiment of the present disclosure, prior to connector assemblies mounted to the system.
Figure 2:
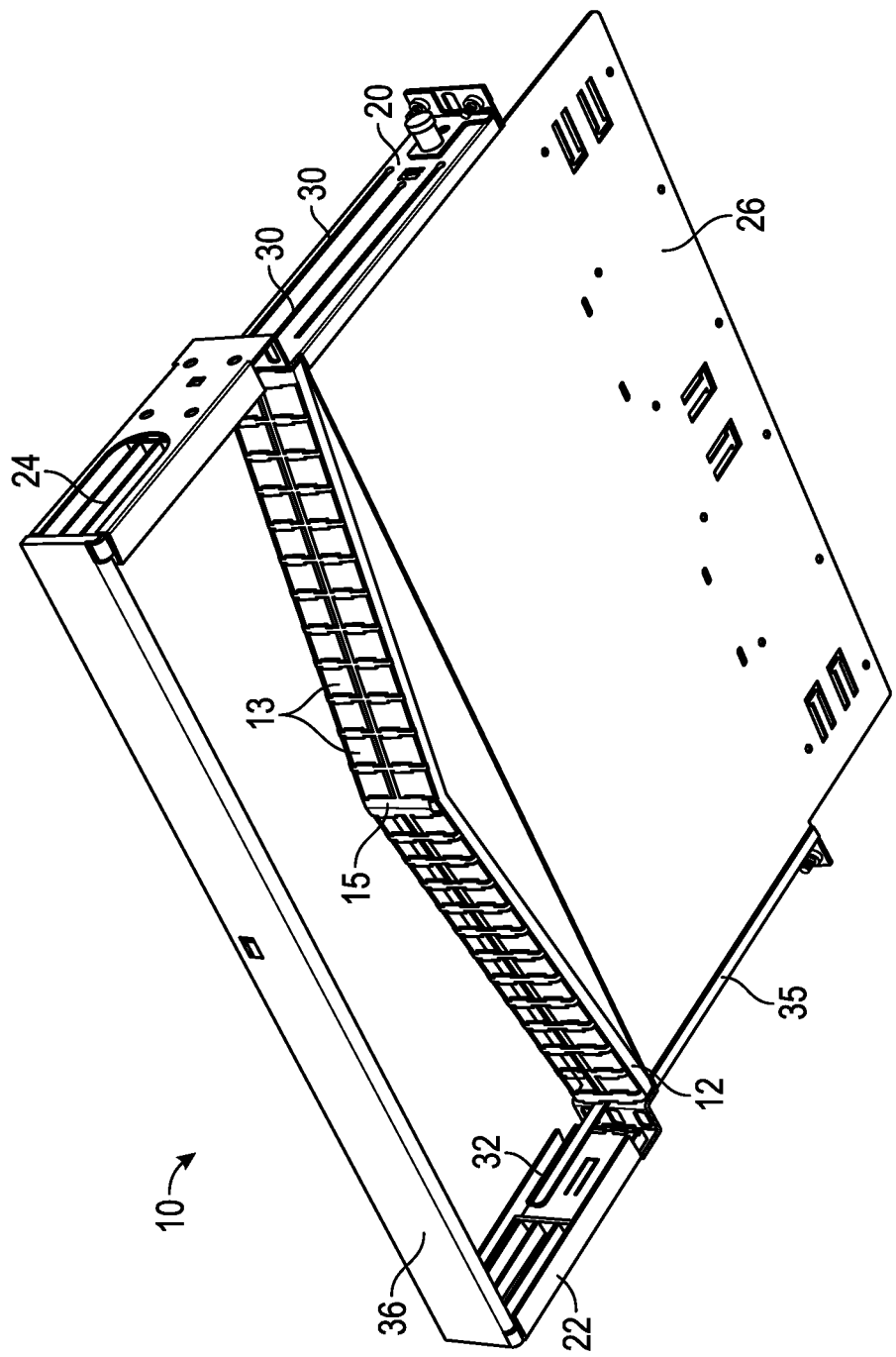
FIG. 2 is a bottom perspective view of the system of FIG. 1.
Figure 3:
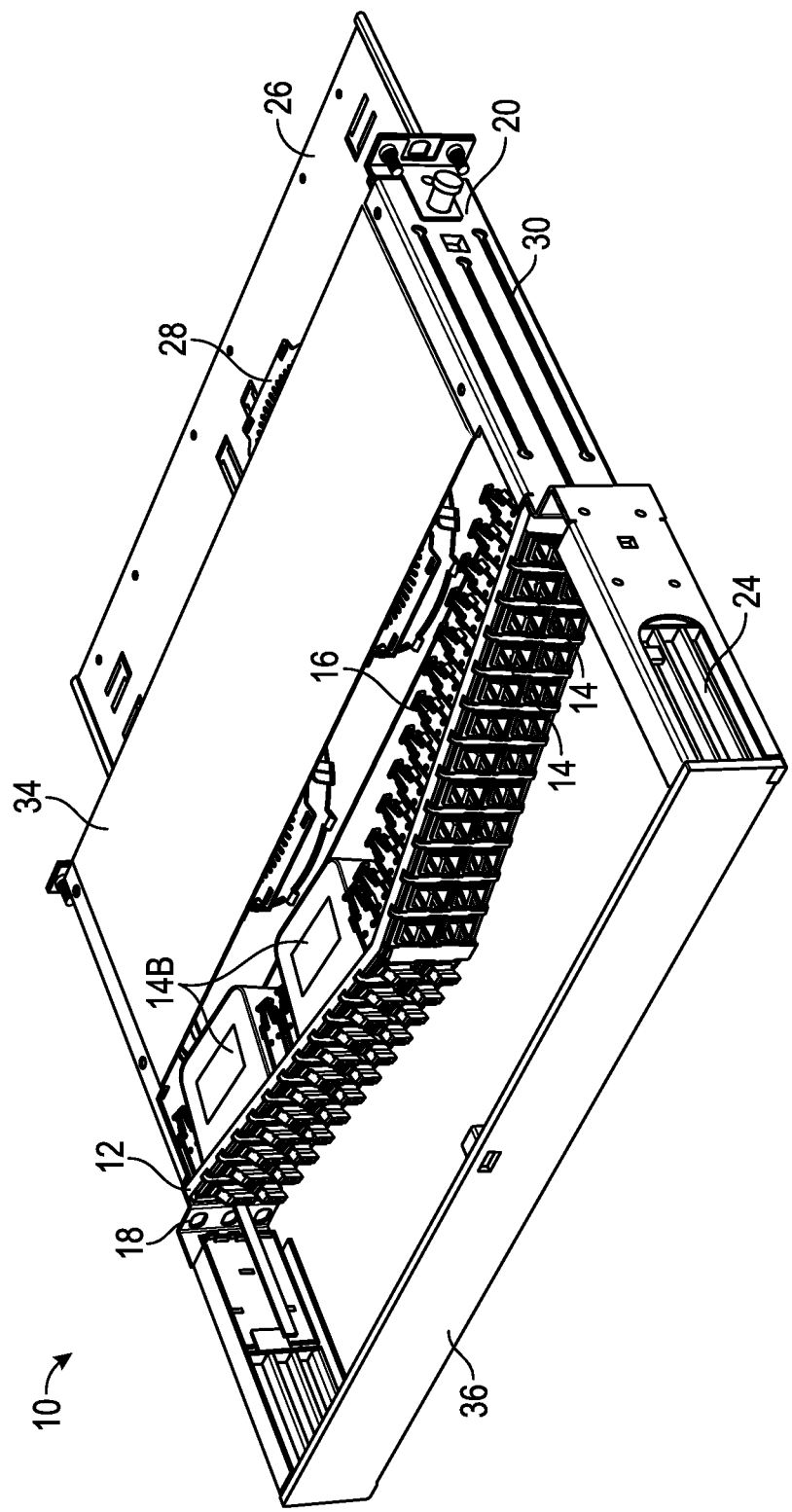
FIG. 3 is a top perspective view of the system of FIG. 1, after exemplary connector assemblies are mounted to the system.
Figure 4:
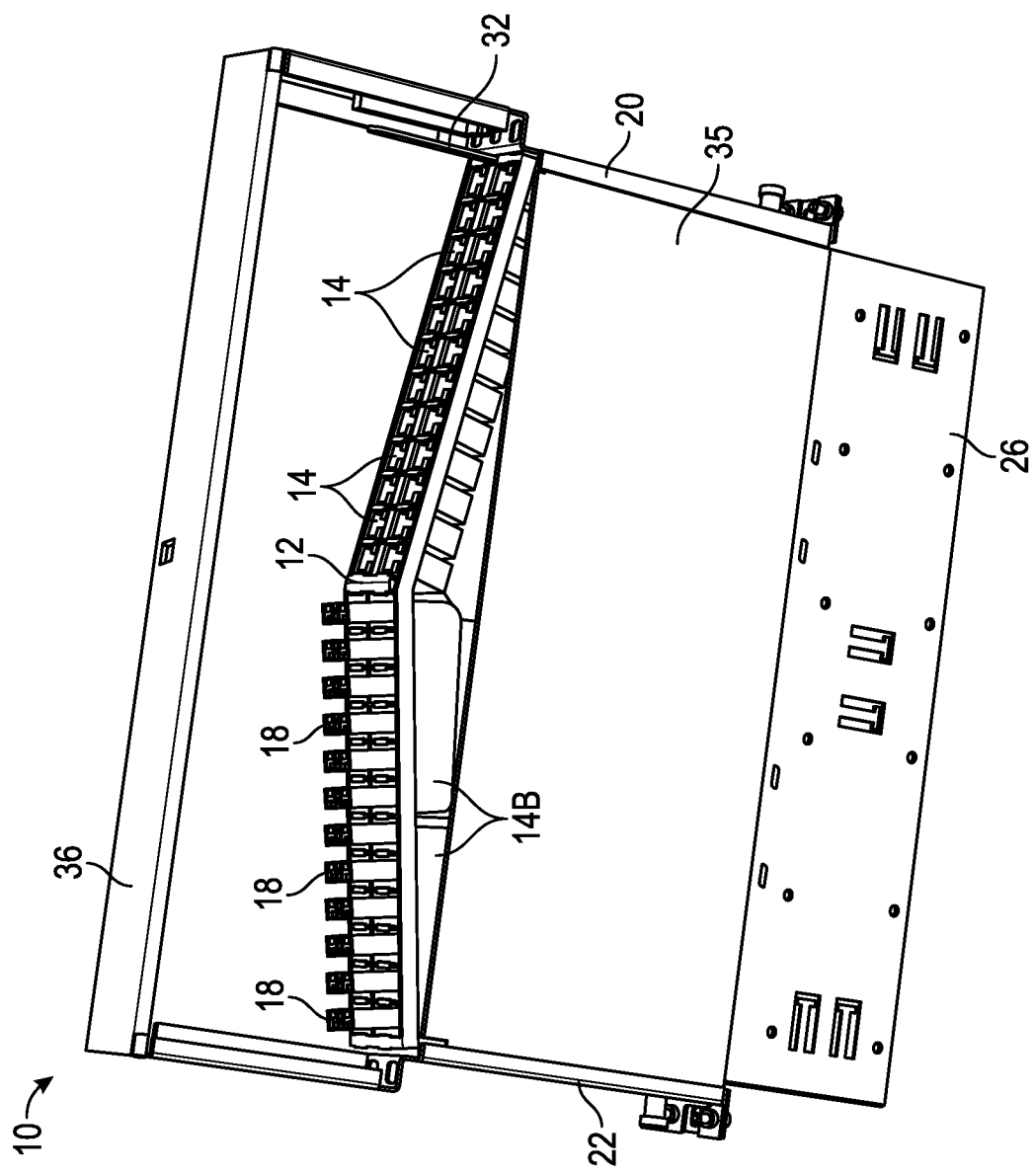
FIG. 4 is a bottom perspective view of the system of FIG. 3.
Figure 5:
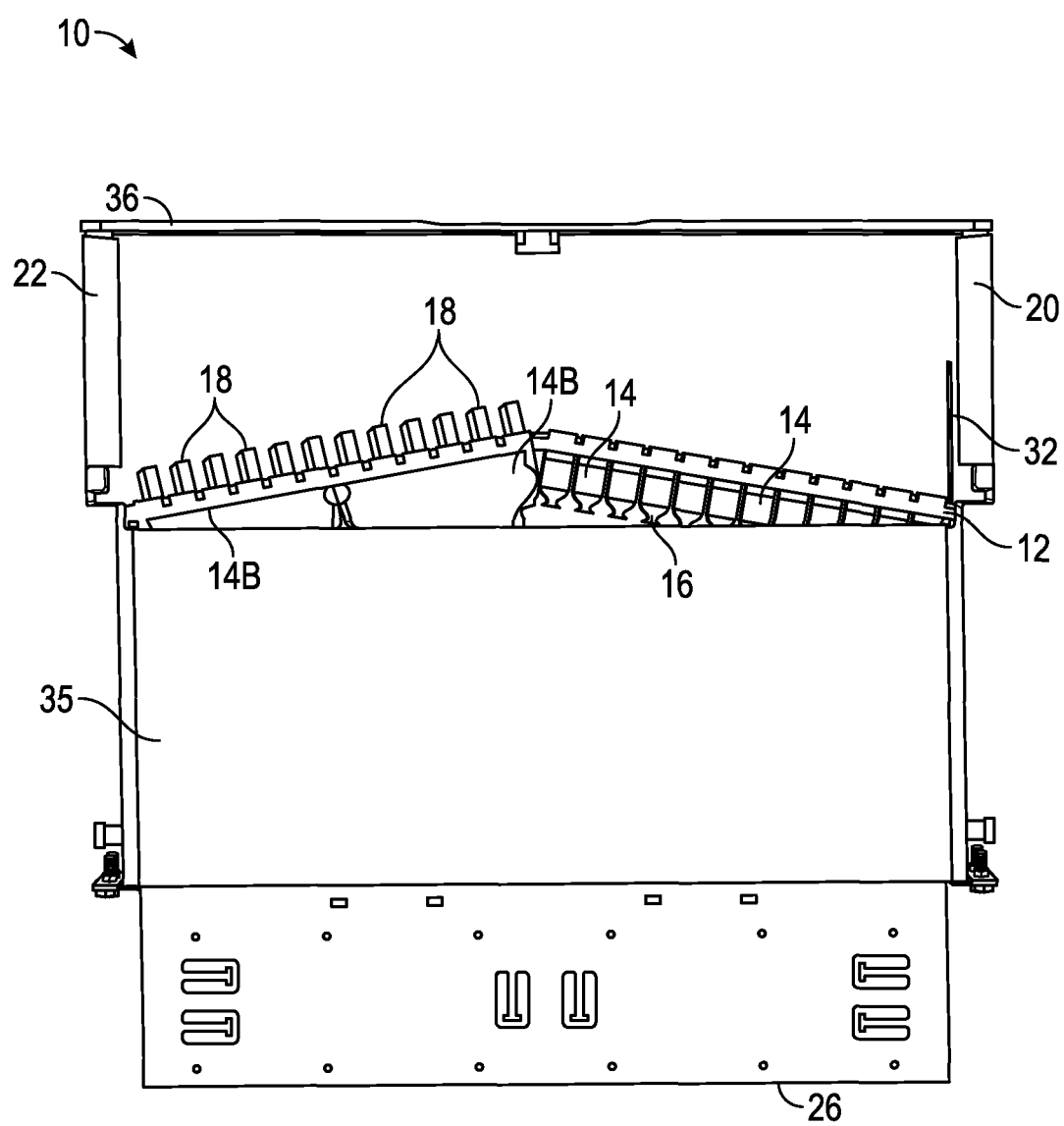
FIG. 5 is a bottom view of the system of FIG. 3.
Figure 6:
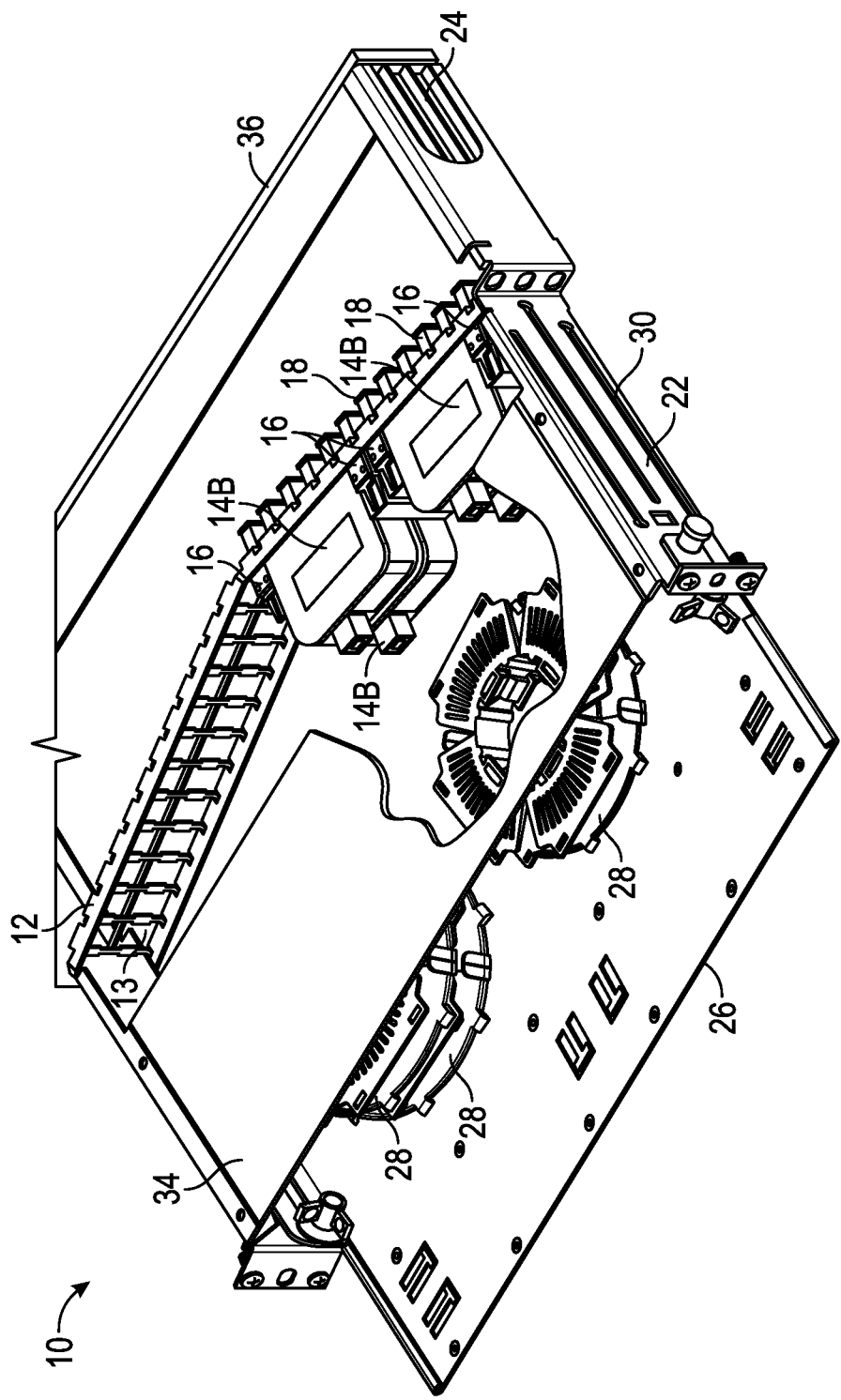
FIG. 6 is a partial top perspective view of the system of FIG. 1, after exemplary connector assemblies are mounted to the system.
Figure 7:
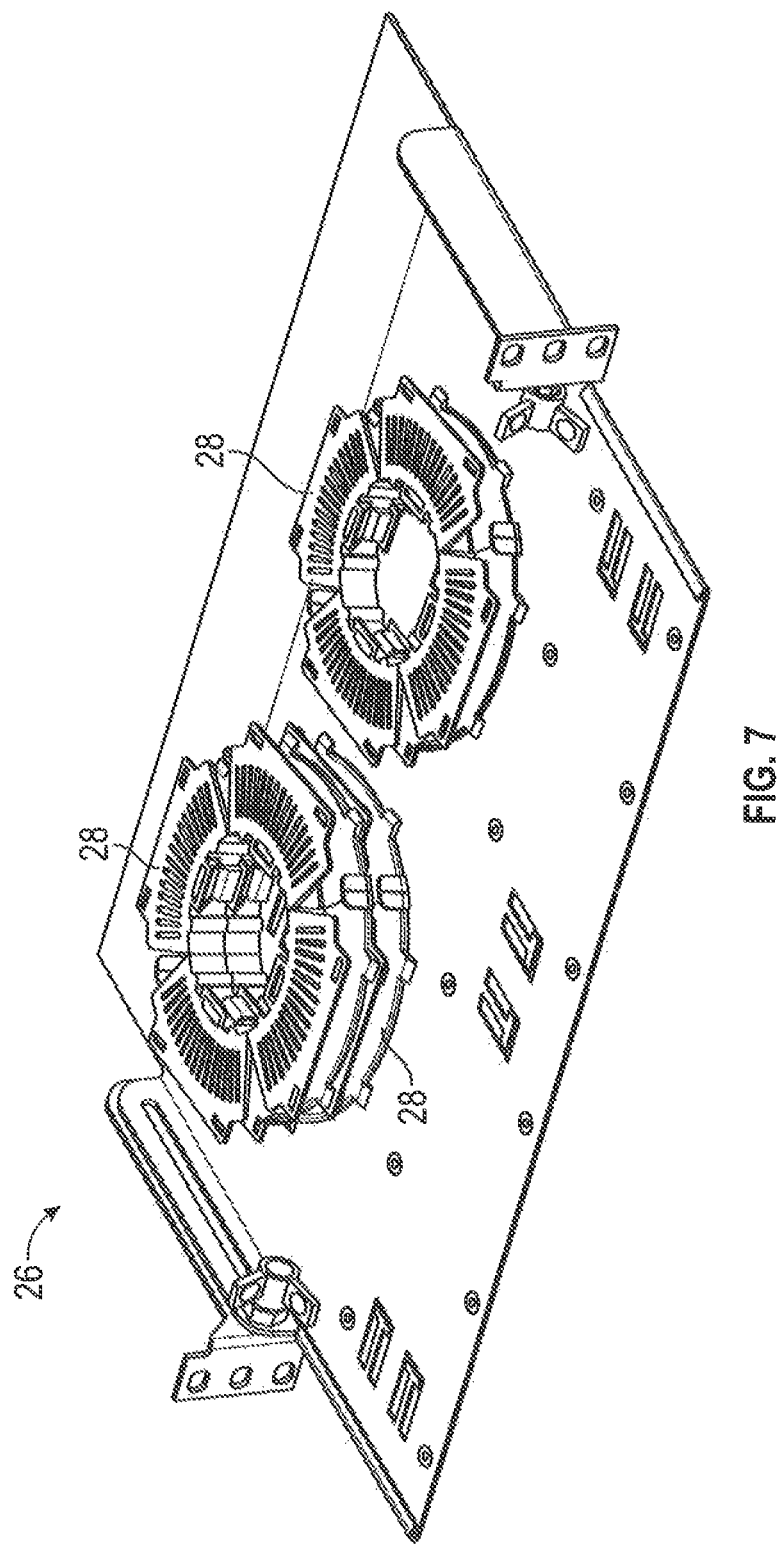
FIG. 7 is a top perspective view of the cable management plate of the system of FIG. 1.

The exemplary embodiments disclosed herein are illustrative of advantageous media patching systems of the present disclosure and methods/techniques thereof. It should be understood, however, that the disclosed embodiments are merely exemplary of the present disclosure, which may be embodied in various forms. Therefore, details disclosed herein with reference to exemplary patching systems/fabrication methods and associated processes/techniques of assembly and use are not to be interpreted as limiting, but merely as the basis for teaching one skilled in the art how to make and use the advantageous patching systems and/or alternative assemblies of the present disclosure.

In general, the present disclosure provides improved patching systems (e.g., patch panel assemblies), and related methods of use. The present disclosure provides improved systems/methods for the design and use of patching systems configured to support multiple media connections (e.g., high density, mixed media connections).

More particularly, the present disclosure provides advantageous systems/methods for the design and use of patching systems having one or more bracket members (e.g., Z-shaped bracket members) configured to facilitate cable management. In exemplary embodiments, the bracket members allow a panel assembly to move relative to the bracket members (e.g., for cable management purposes). The present disclosure also provides media patching systems having a door assembly (e.g., mounted with respect to bracket members) that is configured to open, close, lock and unlock as desired by a user.

In certain embodiments, disclosed herein is a high density patching system configured to support multiple media connections. The improved systems provide users with the ability to install multiple media connections (e.g., copper-based and/or fiber optic connections) in the same patching system/enclosure. For example, high density jack patch panels can be utilized to support multiple media connections. The exemplary patching systems can be used to support one or more types of cables used in a communication network. Moreover, exemplary patch panel assemblies disclosed herein can advantageously increase patching density of the media patching system while maintaining port accessibility.

In exemplary embodiments, the present disclosure provides for improved systems/methods for the design/use of patching systems configured to support multiple media connections (e.g., copper and/or fiber optic connections) in the same patching system/enclosure, thereby providing a significant operational, commercial and/or manufacturing advantage as a result. Moreover, the present disclosure also provides for improved patching systems having one or more bracket members (e.g., Z-shaped bracket members), with the bracket members facilitating a panel assembly to move relative to the bracket members for cable management purposes, thereby providing a significant operational, commercial and/or manufacturing advantage as a result.

Referring now to the drawings, like parts are marked throughout the specification and drawings with the same reference numerals, respectively. Drawing figures are not necessarily to scale and in certain views, parts may have been exaggerated for purposes of clarity.

With reference to FIGS. 1-6, there is illustrated an embodiment of an exemplary media patching system 10 according to the present disclosure. In general, media patching system 10 is configured and dimensioned to be used as a patching system for media connections. It is noted that media patching system 10 can take a variety of forms, shapes and/or designs.

In general, media patching system 10 includes a panel assembly 12 (e.g., patch panel assembly/multi-connector panel assembly 12). Exemplary panel assembly 12 has a front panel surface/segment 15 that includes a plurality of apertures 13 therethrough. As discussed in further detail below, each aperture 13 is typically configured and dimensioned to have a connector assembly/connective device 14, or 14B mounted with respect thereto (FIGS. 3-6, and 11). It is noted that the front panel surface/segment 15 of panel assembly 12 can be angled (as shown), or it can be substantially flat or planar as is shown in co-pending application Ser. Nos. 14/683,433 and 14/683,569.

As shown in FIGS. 1 and 3-5, one or more connector assemblies 14 can be mounted with respect to panel assembly 12 (e.g., with one aperture 13 configured to house/mount to one assembly 14), as described and disclosed in U.S. Pat. Nos. 8,439,702 and 8,672,709 noted above. More particularly, each connector assembly 14 typically includes a movable locking member 16 (FIG. 3) that is configured to releasably secure the connector assembly 14 to panel assembly 12 as described and disclosed in U.S. Pat. Nos. 8,439,702 and 8,672,709. Panel assembly 12 can include any number of connector assemblies 14 mounted thereon (e.g., one, two, three, four, a plurality, etc.).

Each exemplary connector assembly 14 takes the form of a copper-based electrical connector assembly 14. More particularly, it is noted that each connector assembly 14 includes a jack housing (e.g., high density modular communication jack housing) that is adapted to receive signals from a mating connecting assembly (e.g., a plug connector, such as an RJ-45 plug or an IEC 60603-7-7 compliant plug) inserted or introduced to a receiving space of the jack housing. As such, associated contacts (e.g., eight contacts) or the like of the jack housing are positioned for electrical communication with data signal transmission media plug elements/contacts introduced to the receiving space of the jack housing. In general, the jack housing of electrical connector assembly 14 is suitable for use in various applications, e.g., for interfacing with high frequency data transfer media, connection to data transfer devices or the like, etc. For example, the jack housing of connector assembly 14 may be mounted to a printed circuit board (PCB) and signals may transfer from a plug connector introduced to the receiving space of connector assembly 14 to the PCB and then to insulation displacement contacts (IDCs), thus completing the data interface and transfer through connector assembly 14.

In other embodiments, panel assembly 12 can have one or more fiber-optic connector assemblies mounted thereon (via apertures 13) as is shown and described in co-pending application Ser. Nos. 14/683,433 and 14/683,569. Panel assembly 12 can include any number of fiber-optic connector assemblies mounted thereon (e.g., one, two, three, four, a plurality, etc.).

More particularly, each connector fiber-optic assembly includes one or more ports/adapters to facilitate communication with a mating assembly (e.g., fiber optic connector), that in turn can interact with various fiber optic media (fiber optic cables, etc.). The ports/adapters of assembly are typically positioned for communication with fiber optic connectors introduced to a receiving space of connector assembly. Similar to connector assembly 14, each fiber-optic connector assembly can include a movable locking member 16 that is configured to releasably secure the connector assembly to panel assembly 12, as described above.

As shown in FIGS. 3-6, one or more connector assemblies 14B can be mounted with respect to panel assembly 12. Panel assembly 12 can include any number of connector assemblies 14B mounted thereon. Exemplary connector assembly 14B takes the form of a fiber optic cassette 14B having a plurality of fiber optic ports/adapters (e.g., 12 ports) for mating with fiber optic connectors. In certain embodiments, connector assembly 14B includes six port housings 18, with each port housing 18 including two or more fiber optic ports/adapters (e.g., LC, SC, MPO adapters).

Each port housing 18 is configured to be inserted through and mounted with respect to six respective apertures 13 of panel assembly 12 via locking members 16 disposed on each top end of connector assembly 14B (FIG. 3), as similarly discussed above for locking members 16 of assemblies 14. It is noted that connector assembly 14B can include any suitable number of port housings 18 and/or fiber optic ports and/or locking members 16 for mounting to panel assembly 12, and/or for fiber optic communication purposes.

Figure 11:
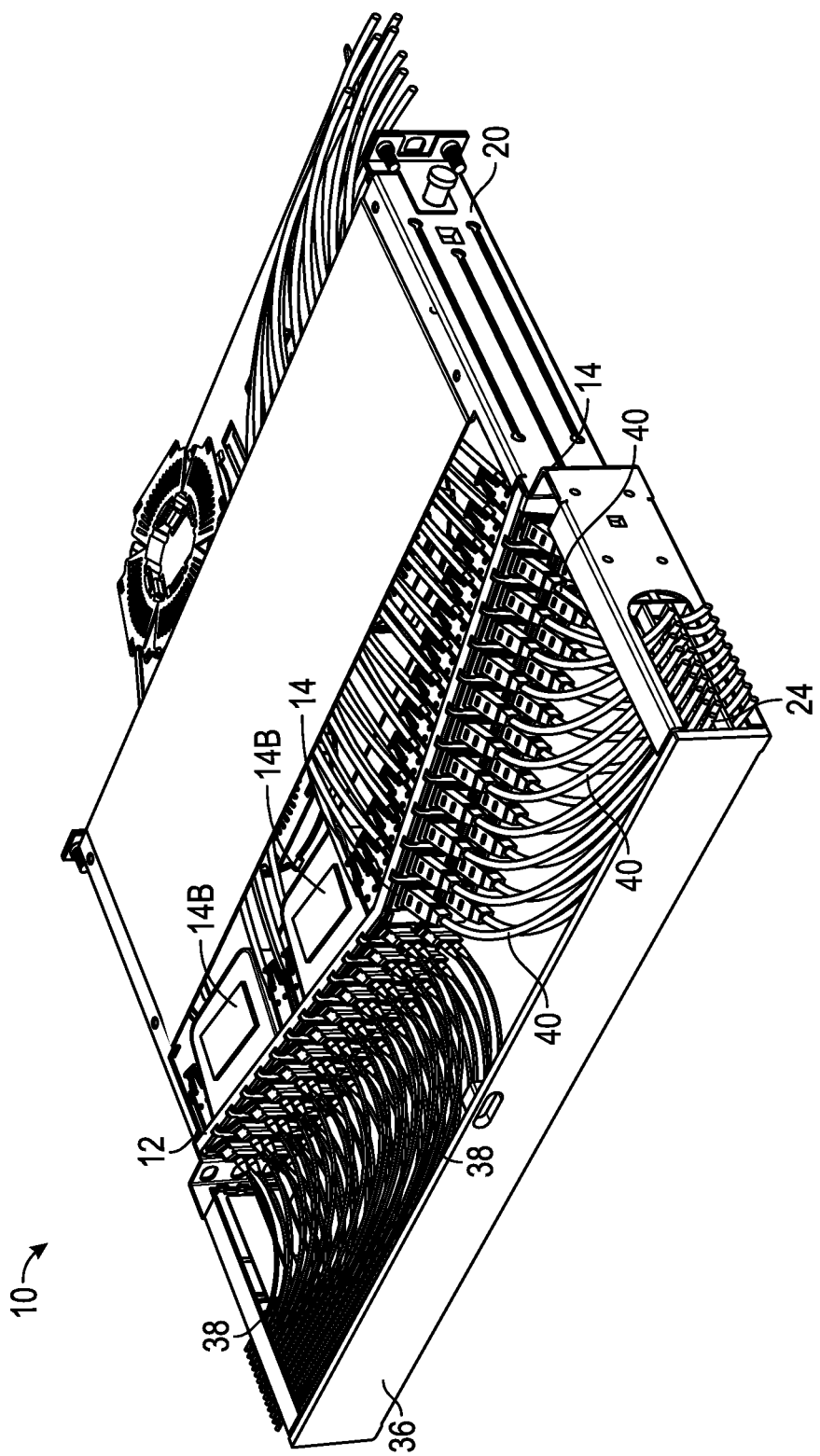
FIG. 11 is a top perspective view of the system of FIG. 3, after exemplary cables/wires are mounted to the system.

It is noted that panel assembly 12 of system 10 can include any number, combination and/or permutation of connector assemblies/connector devices. Thus, panel assembly 12 of system 10 advantageously provides users with the ability to install multiple (mixed) media connections (e.g., copper-based and/or fiber optic connections) in the same patching system/enclosure 10. Moreover, panel assembly 12 can advantageously increase patching density of the media patching system 10 while maintaining port accessibility. FIG. 11 shows a plurality of cables 38 mounted with respect to the ports of connector assemblies 14B, and a plurality of cables 40 mounted with respect to the jack housings of connector assemblies 14. Additionally, front face 15 of panel assembly can have different alternative constructions, including one or more constructions in which apertures 13 are larger and are configured and dimensioned for the mounting of bezels as is shown and described in co-pending application Ser. Nos. 14/683,433 and 14/683,569.

Figure 12:
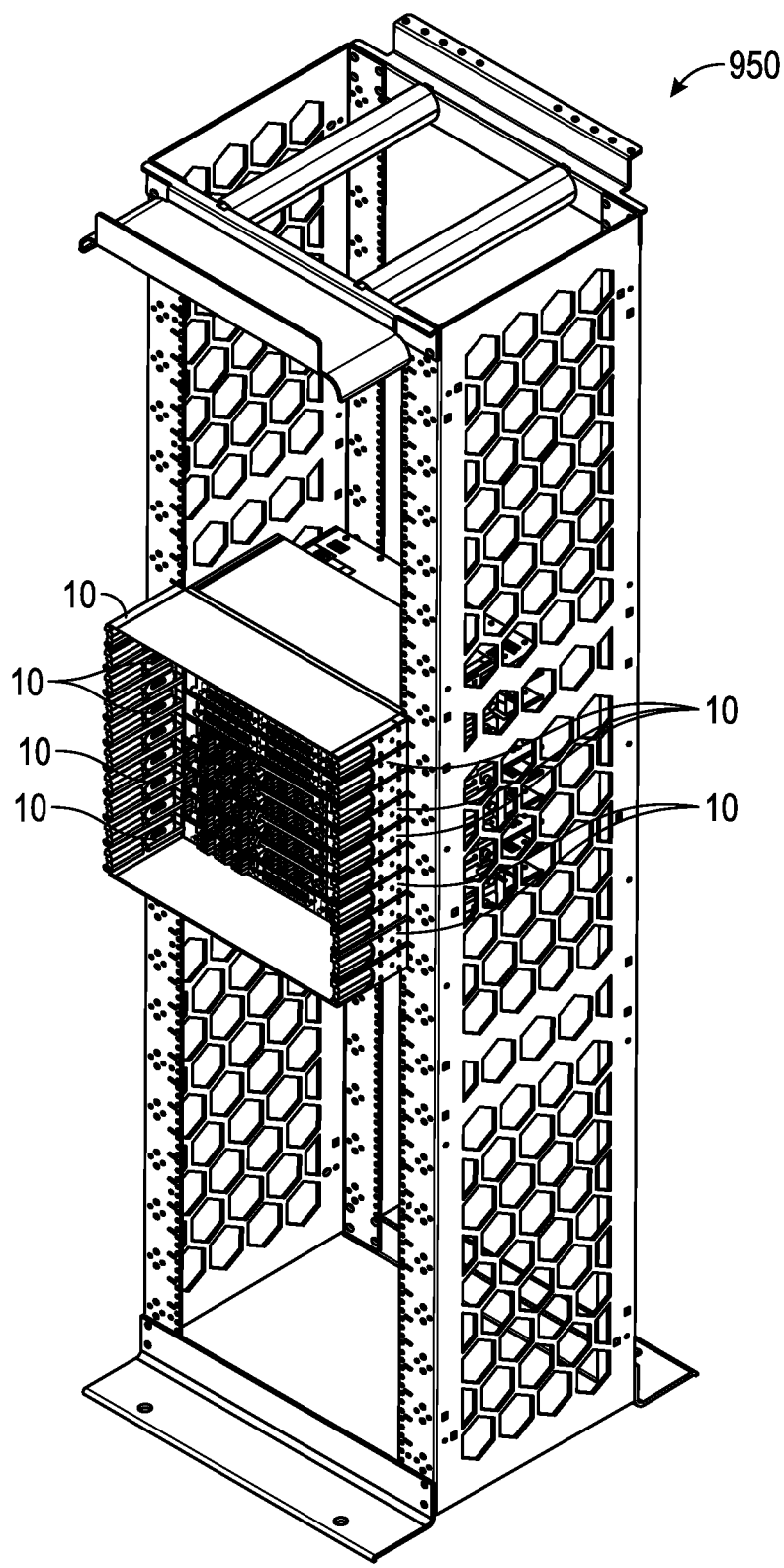
FIG. 12 is a side perspective view of exemplary media patching systems mounted with respect to a supporting structure.

In certain embodiments, media patching system 10 is configured and dimensioned to be mounted with respect to a supporting structure 950 (e.g., rack 950—FIG. 12) or the like. As shown in FIG. 12, it is noted that exemplary media patching systems 10 is adapted for use in conjunction with a rack 950 (e.g., network or server rack) or the like, although the present disclosure is not limited thereto. Rather, the disclosed media patching system 10 is adapted for use in conjunction with other structures, such as, for example, frames, cabinets, supporting structures, or other structures that stand to benefit from proximate cable management functionality. For ease of disclosure, the potential structures to which the disclosed system 10 may be mounted are collective referred to as "rack(s)." However, it is to be understood that the present disclosure is not limited by or to implementations wherein the disclosed system 10 is mounted with respect to, or used in conjunction with, a rack 950, but may be mounted with respect to, or used in conjunction with other structures/units (e.g., structures/units associated with cable routing).

As shown in FIG. 12, one or more media patching systems 10 can be mounted with respect to rack 950 or the like. Any suitable number of systems 10 can be mounted with respect to rack 950, and the systems 10 may or may not include cover members 33, 34 and/or 35. For example and as shown in FIG. 12, ten systems 10 are mounted with respect to rack 950, with the ten systems mounted proximal to one another within rack 950. In one embodiment, the top system 10 in rack 950 includes top cover members 33 and 34, and the bottom system 10 includes bottom cover member 35.

Exemplary rack 950 is depicted in FIG. 12, and such rack 950 and other exemplary mounting structures suitable for use with systems 10 are described and disclosed in U.S. Pat. No. 7,983,038, which is hereby incorporated by reference in its entirety. However and as noted above, systems 10 may be mounted with respect to or used in conjunction with other structures/units.

Figure 9:
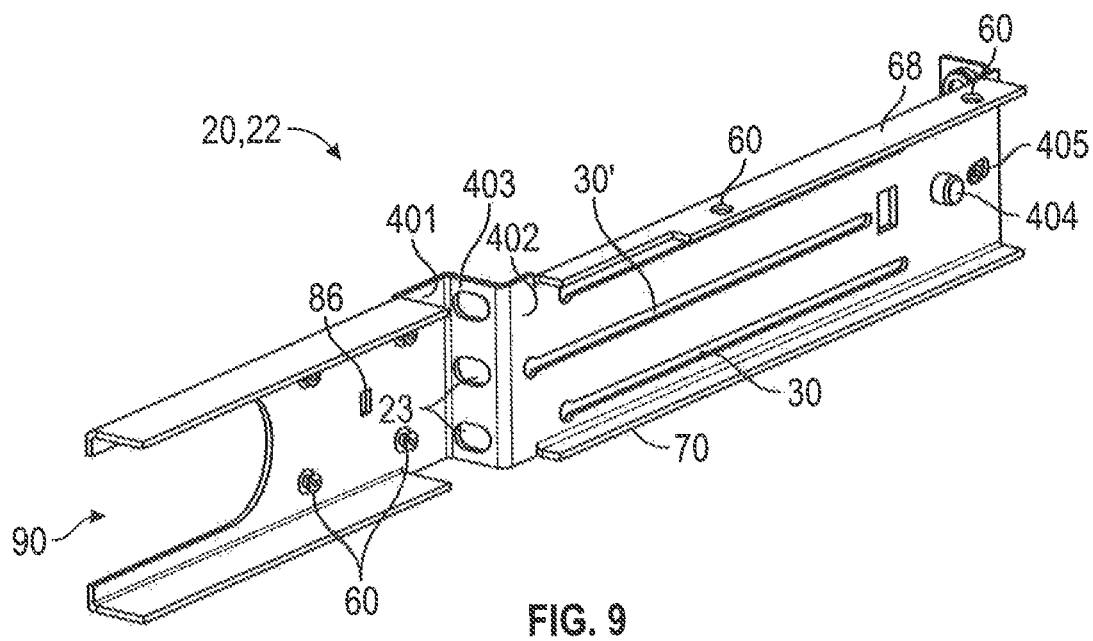
FIG. 9 is a side perspective view of a bracket member of the system of FIG. 1.

Panel assembly 12 (e.g., patch panel assembly/multi-connector panel assembly 12) of media patching system 10 can be mounted with respect to a first bracket member 20 and a second bracket member 22 (FIGS. 1 and 9). A cable management member 24 can be mounted with respect to each bracket member 20, 22 for cable/wire management purposes of system 10. Each bracket member 20, 22 can be mounted with respect to a cable management plate 26. Cable management plate 26 can include one or more cable management spool assemblies 28 or the like removably mounted thereon for cable/wire management purposes of system 10. System 10 may or may not include top covers 33, 34 and/or bottom cover 35 (e.g., mounted with respect to bracket members 20, 22). System 10 may also include a door assembly 36 (e.g., mounted with respect to bracket members 20, 22) that is configured to open, close, lock and unlock as desired by a user.

In certain embodiments, panel assembly 12 can be movably mounted relative to bracket members 20, 22 via one or more slots 30 of bracket members 20, 22. Pull tab members 32 of panel assembly 12 can facilitate movement of panel assembly 12 relative to bracket members 20, 22.

Figure 13:
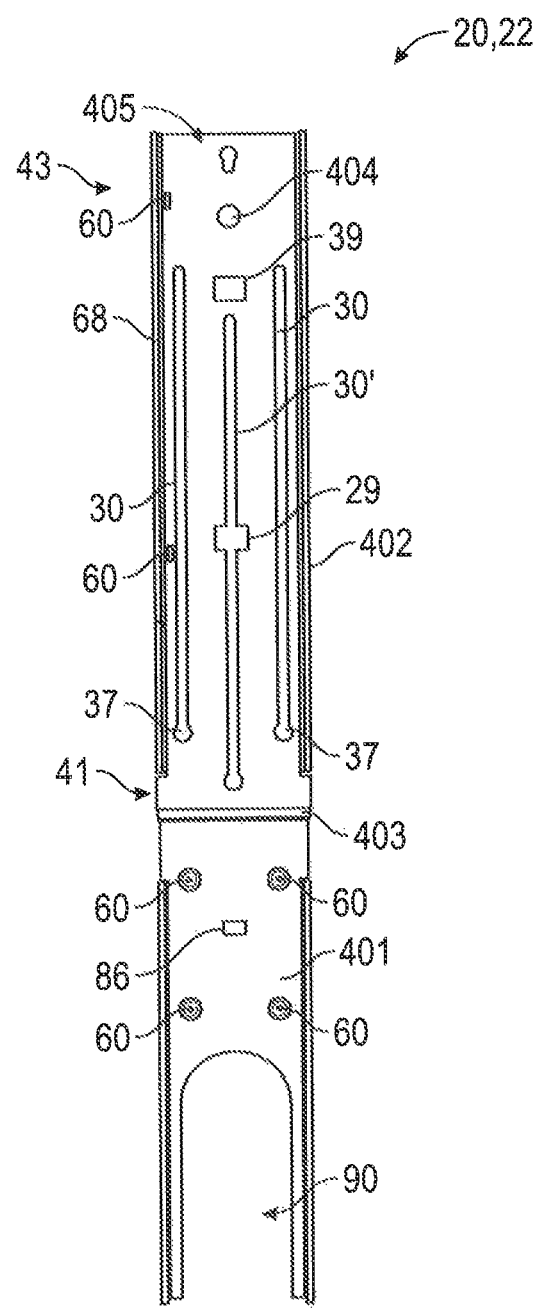
FIG. 13 is a side view of the exemplary bracket member of FIG. 9.

With reference to FIGS. 9 and 13, perspective and side views of exemplary bracket members 20, 22 are shown. In exemplary embodiments, each bracket member 20, 22 defines a substantially z-shaped configuration, including a first planar segment 401, a second planar segment 402, and a third planar segment 403 connecting the first and second planar segments 401, 402. As discussed further below, exemplary first and second planar segments 401, 402 are substantially parallel relative to each other and define sides of the media patching system 10. One or more slots 30 can extend along the length defined by second planar segment 402. Exemplary third planar segment 403 is substantially perpendicular to first and second planar segments 401, 402, although the present disclosure is not limited thereto.

Exemplary bracket members 20, 22 include a first aperture 404 and a second aperture 405 spaced relative to each other and passing through the second planar segment 402. Exemplary first aperture 404 defines a circular shape. Second aperture 405 can define a circular shape including a slot extending therefrom (e.g., a keyhole aperture 405). As discussed further below, first and second apertures 404, 405 can be used to detachably secure the cable management plate 26 to the bracket members 20, 22.

Figure 14:
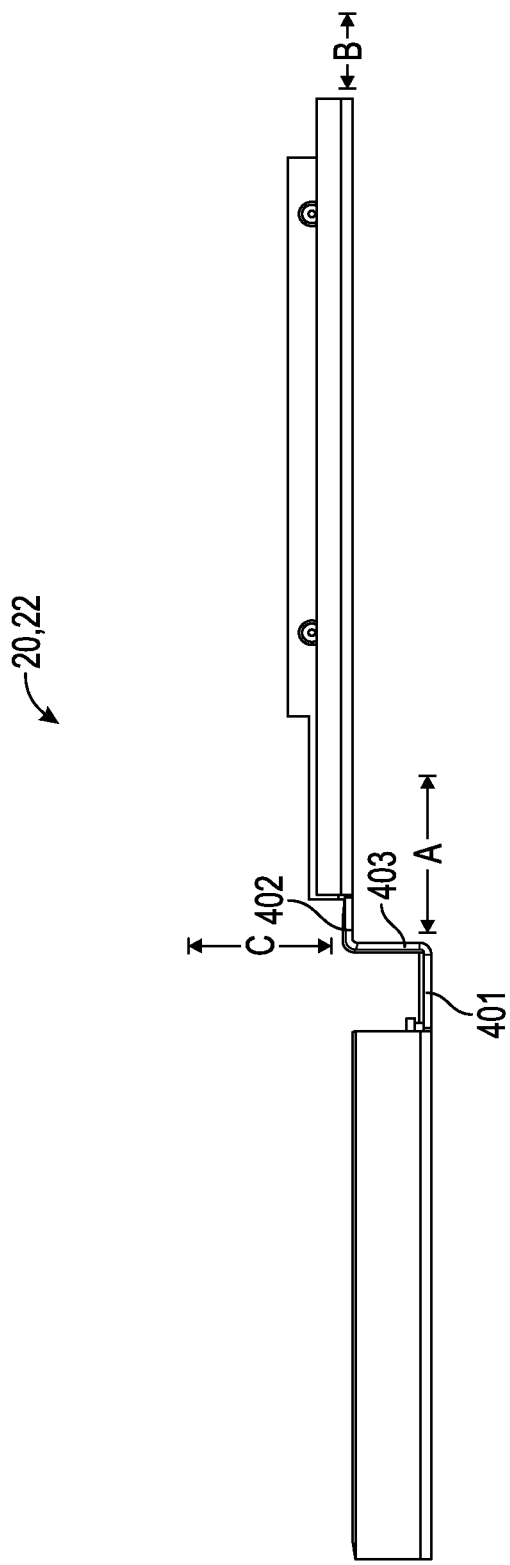
FIG. 14 is a bottom view of the exemplary bracket member of FIG. 13.

With reference again to FIGS. 9 and 13, and also to FIG. 14, each exemplary bracket member 20, 22 defines a substantially z-shaped configuration, including a first planar segment 401, a second planar segment 402, and a third planar segment 403 connecting the first and second planar segments 401, 402.

More particularly and as shown in FIG. 14, first planar segment 401 defines the plane of Arrow A, second planar segment 402 defines the plane of Arrow B, and third planar segment 403 defines the plane of Arrow C. As noted, exemplary first and second planar segments 401, 402 are substantially parallel relative to each other and define sides of the media patching system 10. Exemplary third planar segment 403 is substantially perpendicular/transverse to first and second planar segments 401, 402, and exemplary first and second planar segments 401, 402 are substantially parallel relative to each other and are spaced apart from one another, although the present disclosure is not limited thereto.

As shown in FIG. 13, one or more slots 30 can extend along a length defined by second planar segment 402. In certain embodiments, second planar segment 402 includes top and bottom slots 30, and a middle slot 30' positioned between the top and bottom slots 30. In general, slots 30, 30' extend through segment 402 (and slots 29, 37, 39 extend through segment 402, discussed below). In some embodiments and as shown in FIG. 13, middle slot 30' includes an enlarged slot portion 29. Exemplary enlarged slot portion 29 takes the form of a rectangular or square slot portion 29, although the present disclosure is not limited thereto. Rather, slot portion 29 can take a variety of forms/shapes (e.g., polygonal, circular, etc.). Enlarged slot portion 29 can be positioned at a suitable position along the length of slot 30' (e.g., approximately half-way along the length of slot 30'; at or near the proximal end of slot 30', etc.). It is noted that middle slot 30' may or may not include enlarged slot portion 29.

The proximal ends of slots 30, 30' can include enlarged/detent portions 37 (e.g., positioned at, near or proximal to proximal end 41 of second planar segment 402). Enlarged/detent portions 37 can take a variety of forms/shapes (e.g., circular, polygonal, etc.). In general and as discussed further below, enlarged portions 37 act as a detent to position the sliding panel assembly 112, and provide a means/position to mount the panel assembly 112 to the bracket members 20, 22.

Exemplary second segment 402 can also include distal slot portion 39 positioned at or near (e.g., proximal to) distal end 43 of second planar segment 402 (e.g., spaced from the distal end of slot 30' and substantially axially aligned with slot portion 29). Distal slot portion 39 can take a variety of forms/shapes (e.g., polygonal, circular, etc.).

With reference again to FIG. 9, the third segment 403 of each bracket member 20, 22 typically includes one or more apertures 23 (e.g., three apertures 23) therethrough. In general, each aperture 23 is configured and dimensioned to allow bracket member 20, 22 to be mounted with respect to rack 950 (FIG. 13) or the like (e.g., via corresponding apertures on rack 950, and with fastening members or the like through the respectively aligned bracket/rack apertures).

In exemplary embodiments, each bracket member 20, 22 is fabricated from a single piece of material (e.g., fabricated from a single piece of sheet metal or the like), although the present disclosure is not limited thereto. As such, exemplary bracket members 20, 22 advantageously reduce cost by eliminating extra parts required to mount a system 10 to a rack 950 or the like. Moreover, the exemplary bracket members 20, 22 advantageously reduce the amount of weight (e.g., the amount of metal) needed to fabricate the system 10, while still providing sufficient structural rigidity to system 10.

In other embodiments, it is noted that each bracket member 20, 22 can be fabricated from a variety of materials (e.g., from one material, or from a combination of materials), and can take a variety of shapes/designs.

Figure 15:
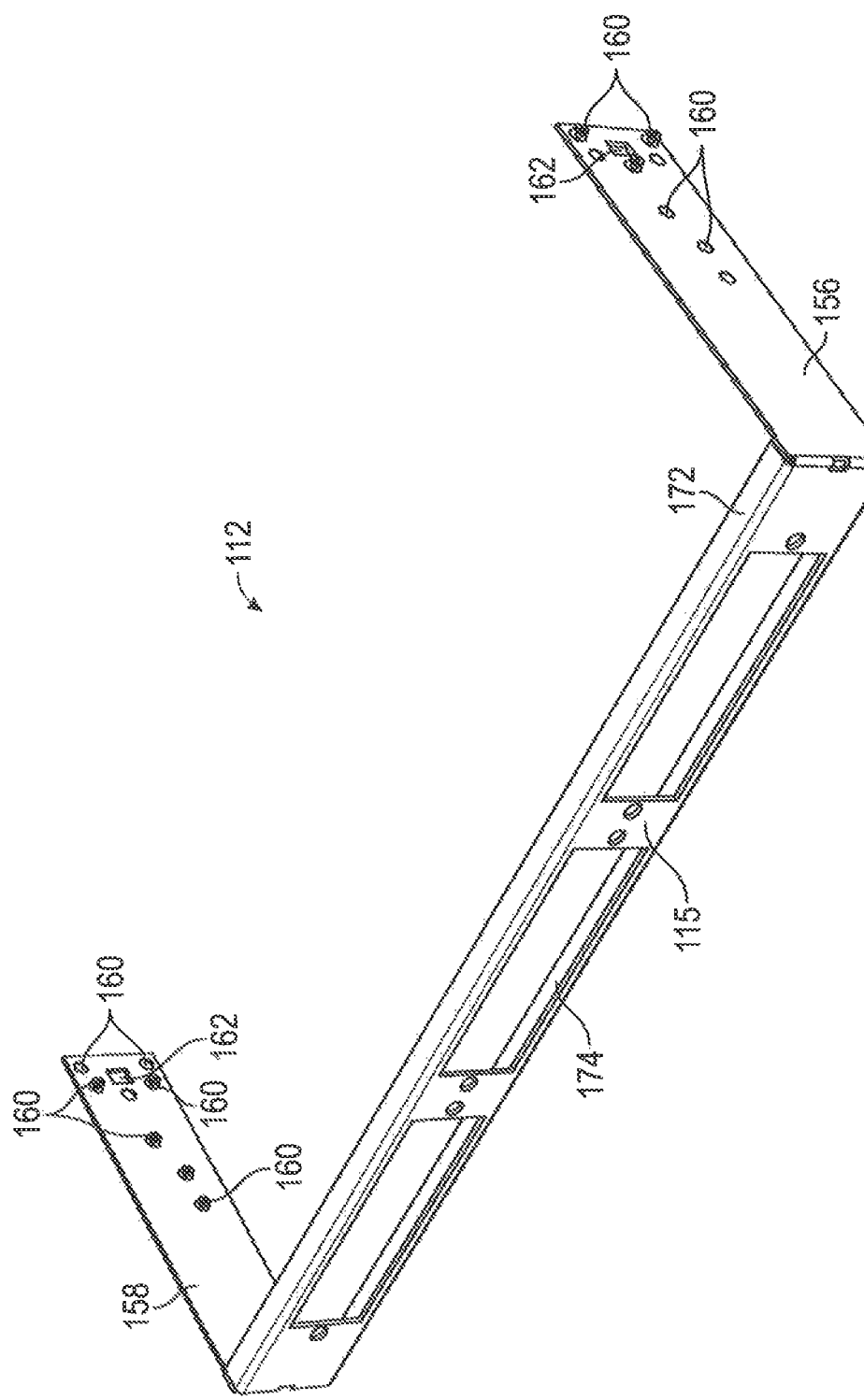
FIG. 15 is a side perspective view of an exemplary panel assembly.

FIG. 15 shows another exemplary panel assembly 112. Panel assembly 112 defines a substantially U-shaped configuration, including the front panel surface/segment 115, a first side segment 156, and a second side segment 158. In general, front panel segment 115 connects the first and second side segments 156, 158 to define the substantially U-shaped configuration of panel assembly 112.

In exemplary embodiments, panel assembly 112 is fabricated from a single piece of material, although the present disclosure is not limited thereto. For example, the segments 115, 156, 158 can be integral to one another, with the side segments 156, 158 bent back to form the substantially U-shaped configuration of panel assembly 112.

Exemplary first and second side segments 156, 158 are substantially parallel relative to each other and define sides of the panel assembly 112. Exemplary front panel segment 115 is substantially perpendicular to first and second side segments 156, 158, although the present disclosure is not limited thereto. Rather, it is noted that front panel segment 115 can be angled (e.g., similar to panel segment 15 of FIG. 1). As such, assembly 112 (e.g., front panel segment 115) can take a variety of shapes, forms and/or geometries.

Figure 16:
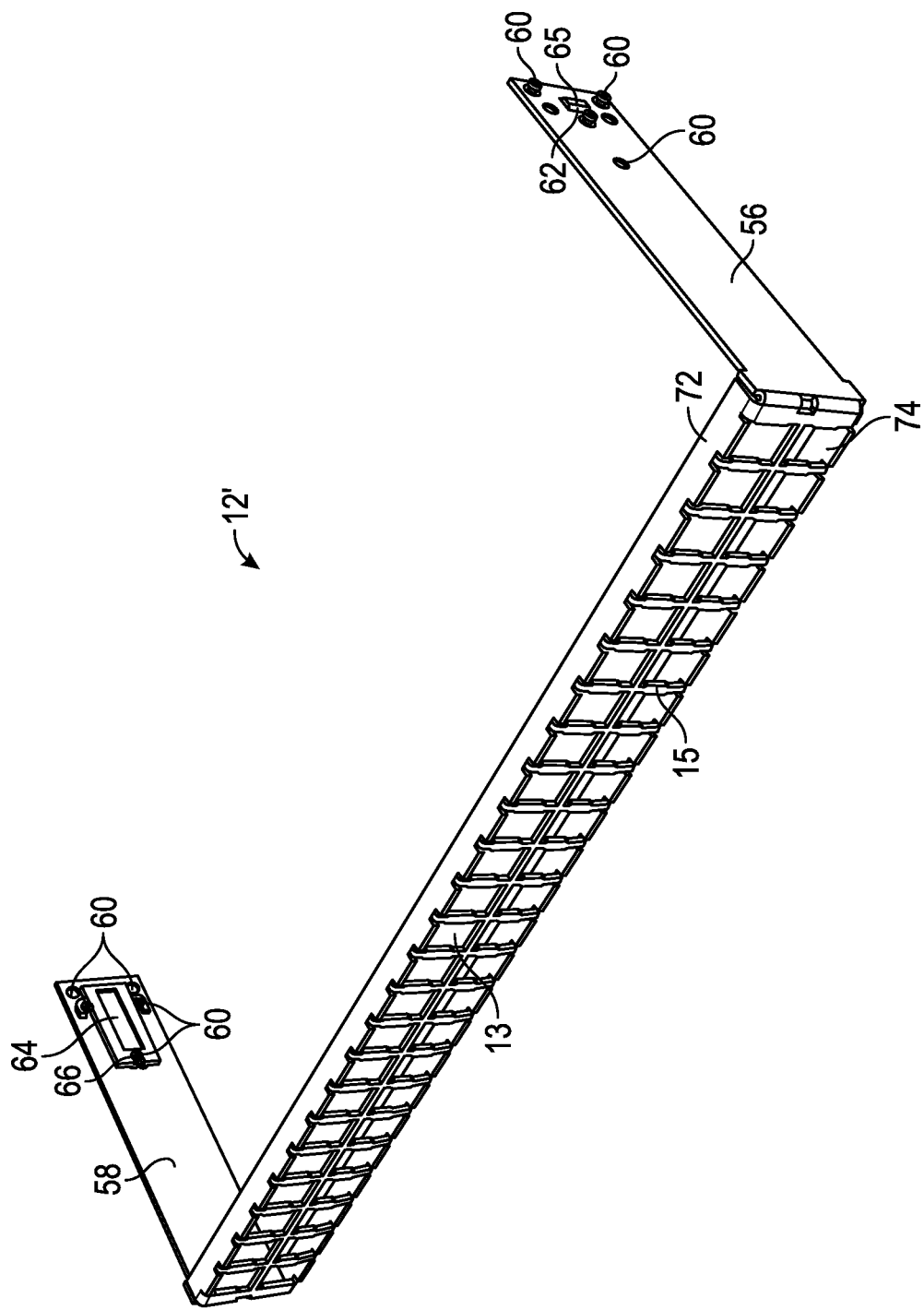
FIG. 16 is a side perspective view of another exemplary panel assembly.

FIG. 16 shows another exemplary panel assembly 12' of the present disclosure. Similar to panel assembly 112 (and panel assembly 12), exemplary panel assembly 12' defines a substantially U-shaped configuration, including the front panel surface/segment 15, a first side segment 56, and a second side segment 58.

Figure 17:
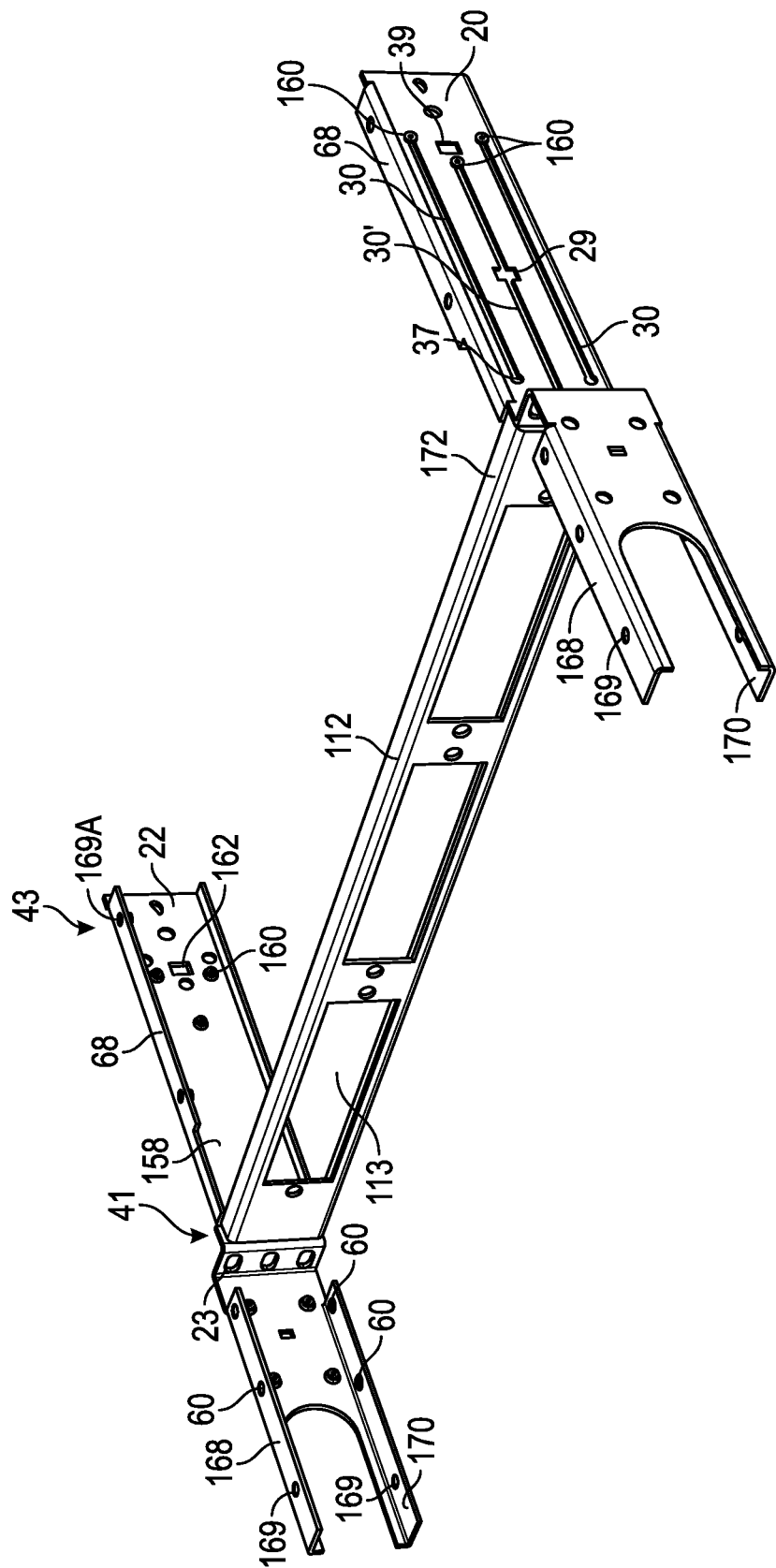
FIG. 17 is a side perspective view of the panel assembly of FIG. 15 mounted with respect to exemplary bracket members.

In exemplary embodiments and as shown in FIGS. 15 and 17, panel assembly 112 (or assembly 12', or assembly 12) can be movably mounted relative to bracket members 20, 22 via one or more slots 30, 30' of bracket members 20, 22 (FIG. 13). As noted above, pull tab members 32, 132 of panel assembly 12, 12', 112 can facilitate movement of panel assembly 12, 12', 112 relative to bracket members 20, 22.

With reference to FIG. 15, the inner surface of first side segment 156 can include one or more protrusion members 160 (e.g., panel fasteners, panel screws, PEMs, etc.) that extend inwards from the inner surface of first side segment 156. Similarly, the inner surface of second side segment 158 can include one or more protrusion members 160.

Moreover, the outer surface of first side segment 156 can include one or more protrusion members 160, and the outer surface of second side segment 158 can include one or more protrusion members 160. The distal end of first and second side segments 156, 158 each can include an aperture 162 therethrough (e.g., rectangular, polygonal, circular aperture 162, etc.).

Similarly and as shown in FIG. 16, the inner and outer surfaces of first side segment 56 can include one or more protrusion members 60, and the inner and outer surfaces of second side segment 58 can include one or more protrusion members 60. The distal end of first and second side segments 56, 58 each can include an aperture 62 therethrough.

In exemplary embodiments and as shown in FIGS. 15-18, a motion limiter member 64 is configured and dimensioned to be mounted with respect to the inner surface of each distal end of first and second side segments 56, 58, 156, 158 of panel assembly 12' or 112.

More particularly and as depicted in FIG. 16, each motion limiter member 64 is configured to mount to one or more inner protrusion members 60 (or 160) of segments 56, 58 (or 156, 158), with a portion of a tab member 65 (e.g., cammed tab member 65) of the motion limiter member 64 protruding and extending through each aperture 62, 162 (e.g., extending through each aperture 62, 162 and beyond the outer surface of segments 56, 58, 156, 158).

Figure 18:
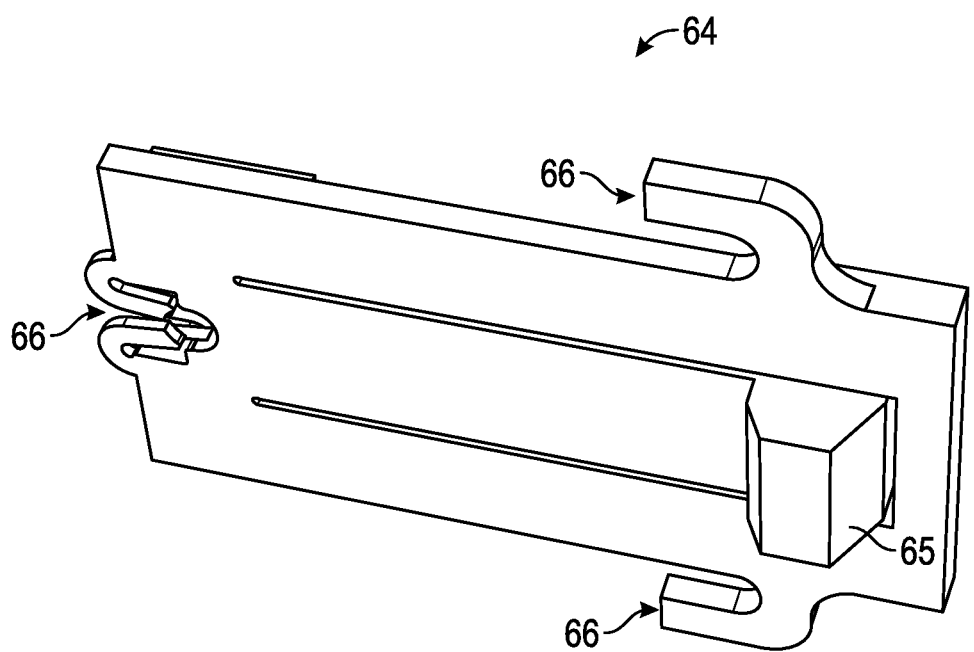
FIG. 18 is a side perspective view of an exemplary motion limiter member.

As shown in FIG. 18, exemplary motion limiter member 64 includes one or more fastener features 66 (e.g., three fastener features 66), with each fastener feature 66 configured to releasably mount to an inner protrusion member 60, 160. One or more fastener features 66 can include members that snap-fit onto a protrusion member 60, 160.

With reference to FIGS. 13 and 15-17, to mount panel assembly 112, 12' (or 12) to bracket members 20, 22, a user can position segments 56, 58, 156, 158 of panel assembly 112, 12' (or 12) between bracket members 20, 22 (e.g., prior to or after bracket members 20, 22 are mounted to rack 950 via apertures 23) so that one or more protrusion members 60, 160 of the outer surface of segments 56, 58, 156, 158 are each positioned within an enlarged portion 37 of slots 30, 30' of bracket members 20, 22.

The panel assembly 112, 12' can then be moved back toward the distal end 43 of bracket members 20, 22 until each outer protrusion member 60, 160 within slots 30, 30' reaches the distal end of slots 30, 30' (FIG. 17), and with a portion of each tab member 65 of the mounted motion limiter member 64 protruding/extending through each aperture 62, 162 and also protruding/extending through each distal slot portion 39 of bracket members 20, 22. As such and in this position, each aperture 62, 162 (and each tab member 65) is respectively aligned with a distal slot portion 39 of a bracket member 20, 22.

However, it is noted that some embodiments may not include a motion limiter member 64 mounted to segments 56, 58, 156 and/or 158, and therefore in this position each aperture 62, 162 is respectively aligned with a distal slot portion 39 of a bracket member 20, 22 without the tab member 65 extending through aligned apertures 62, 162 and slot portions 39 (FIG. 17). With respect to FIG. 17, it is noted that a motion limiter member 64 can be mounted to the inner surfaces of segments 156, 158, as similarly shown in FIG. 16 for panel assembly 12', with the tab member 65 extending through aligned apertures 162 and slot portions 39 in the position shown in FIG. 17.

It is noted that prior to or after mounting the panel assembly 112, 12' (or 12) to bracket members 20, 22, the connector assemblies/connective devices can be mounted with respect to panel assembly 112, 12', 12, as discussed above.

It is noted that a user can move/pull (e.g., via pull tab members 32, 132) the panel assembly 112, 12', 12 from the position shown in FIG. 17 toward the proximal end 41 of second segment 402 of bracket member 20, 22 (FIGS. 13 and 17), with the tab members 65 extending through apertures 62, 162 being released from slot portions 39, and then the panel assembly 112, 12', 12 moving toward proximal end 41 and relative to bracket members 20, 22 with the outer protrusion members 60, 160 traveling within slots 30, 30' until the panel assembly 112, 12', 12 reaches a desired proximal position determined by the user.

For example, the user can move the panel assembly 112, 12', 12 toward proximal end 41 until the tab members 65 extending through apertures 62, 162 also extend through aligned slot portions 29 of slot 30', and with the outer protrusion members 60, 160 positioned within slots 30, 30'. In such a position (tabs 65 in slots 29), a user can easily access and manage the connector assemblies/connective devices of panel assembly 112, 12', 12 (e.g., manage, access, plug, unplug the media, cables, wires, fibers, ports, etc. to or from connector assemblies/connective devices), and/or mount/replace/remove/repair the connector assemblies/connective devices of panel assembly 112, 12', 12.

In this regard, it is noted that when panel assembly 112, 12', 12 is in such a forward position (e.g., with tab members 65 extending through apertures 62, 162 also extending through aligned slot portions 29 of slot 30'), the slot portions 29, via tab members 65 extending therethrough, provide a stop position for panel assembly 112, 12', 12 such that users can easily access and manage assemblies/devices (e.g., when the panel assembly 12', 112, is moved proximally away from the back position shown in FIG. 17).

After a user is done with panel assembly 112, 12', 12 in the forward position (tab members 65 through slot portions 29), the user can move the panel assembly 112, 12', 12 distally to the back position shown in FIG. 17. For example, with user force (distally—via members 32, 132) the tab members 65 can be released from slot portions 29, and then the panel assembly 112, 12', 12 can be moved toward distal end 43 (relative to bracket members 20, 22) with the outer protrusion members 60, 160 traveling within slots 30, 30' until the panel assembly 112, 12', 12 reaches the distal end of slots 30, 30' and with tab members 65 extending through distal slot portions 39. In the back position shown in FIG. 17, it is noted that the panel assembly 112, 12', 12 is also prevented from moving further distally because the top and bottom flanges 68, 70 of second segment 402 (FIG. 9) engage/contact with the respective top and bottom flanges 72, 74, 172, 174 of panel assembly 112, 12', 12 (FIGS. 15-17) when the panel assembly 112, 12', 12 is at or near the back position.

Alternatively, after a user is done with panel assembly 112, 12', 12 in the forward position (tab members 65 through slot portions 29), the user can move the panel assembly 112, 12', 12 even more proximally with the outer protrusion members 60, 160 traveling within slots 30, 30' until the panel assembly 112, 12', 12 reaches the proximal end 41 of slots 30, 30'. At such proximal position, the outer protrusion members 60, 160 are positioned within the enlarged portions 37 of slots 30, 30', and the user can also easily access and manage the assemblies/connective devices, or the user can remove/replace the panel assembly 112, 12', 12 from bracket members 20, 22 (e.g., via removing/disengaging the outer protrusion members 60, 160 from enlarged portions 37 of slots 30, 30').

It is noted that when panel assembly 112, 12', 12 is mounted relative to bracket members 20, 22 via outer protrusion members 60, 160 traveling within slots 30, 30', the user can advantageously move/position the panel assembly 112, 12', 12 to a desired position along slots 30, 30' for access and/or management purposes (e.g., to easily access/manage the assemblies/connective devices). Additionally, a user can easily remove or replace a panel assembly 112, 12', 12 from bracket members 20, 22, as noted above. Further, it is noted that when outer protrusion members 60, 160 travel within slots 30, 30' (e.g., proximally or distally), the slots 30, 30' advantageously prevent binding of the sliding panel assembly 112, 12', 12 as it slides/moves proximally or distally.

Panel assembly 12 and bracket members 20, 22 can have various alternative structures for mounting the panel assembly to the bracket members in a slidable manner, as shown and described in co-pending application Ser. Nos. 14/683,433 and 14/683,569. With reference again to FIGS. 1, 9, 10, 26 and 28, a cable management member 24 can be removably/interchangeably mounted with respect to each bracket member 20, 22 for cable/wire 38, 40 management purposes of system 10.

Figure 10:
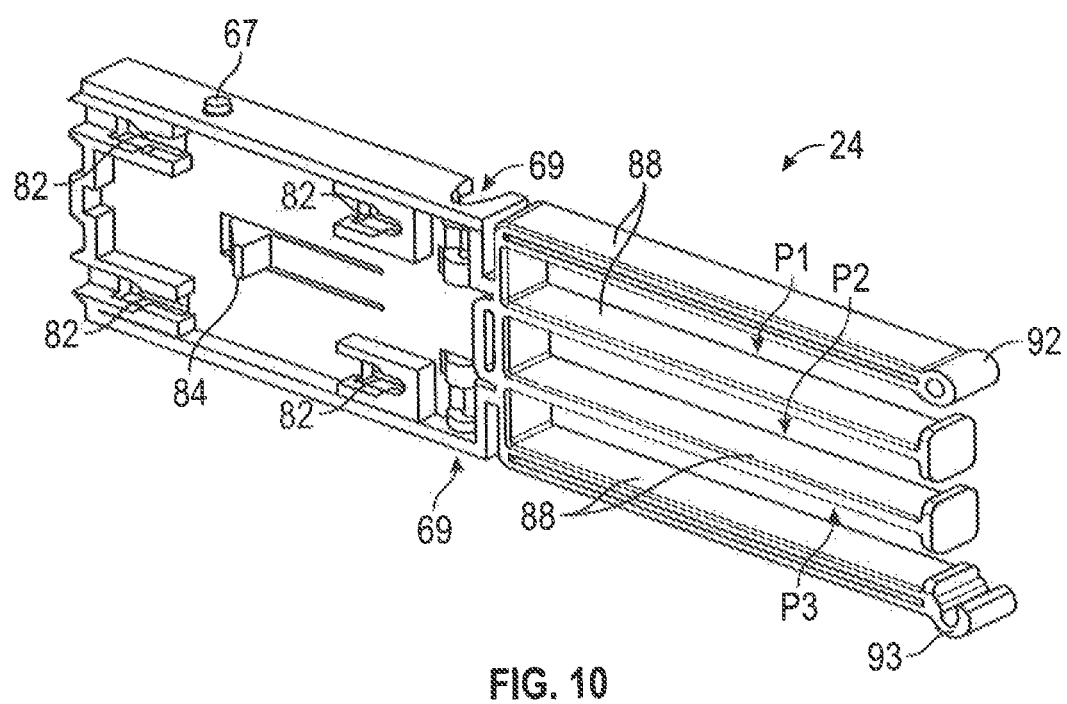
FIG. 10 is a side perspective view of a cable management member of the system of FIG. 1.

As shown in FIGS. 9 and 13, the inner surface of first segment 401 of each bracket member 20, 22 can include one or more protrusion members 60 (e.g., four panel fasteners, panel screws, PEMs, etc.) that extend inwards from the inner surface of first segment 401. As shown in FIG. 10, each cable management member 24 can include one or more corresponding securement slots 82 (e.g., four keyhole slots 82) that allow the cable management member 24 to be releasably secured to a respective protrusion member 60 of segment 401 (FIGS. 1, 9 and 10). Cable management member 24 can also include a tab member 84 that releasably secures to a slot 86 of segment 401 when member 24 is releasably secured or mounted with respect to bracket member 20, 22.

As shown in FIG. 10, cable management member 24 can include one or more extension arms 88 (e.g., cable management arms 88, bend limiting arms 88, etc.) for cable management purposes. In exemplary embodiments, member 24 includes four extension arms 88, with the top extension arm 88 and the arm 88 below it defining a first cable/wire passageway P1, with the middle two extension arms 88 defining a second cable/wire passageway P2, and with the bottom extension arm 88 and the arm 88 above it defining a third cable/wire passageway P3. It is noted that member 24 can include other suitable numbers of arms 88 and respective cable/wire passageways. In general, after member 24 is mounted with respect to bracket member 20, 22, the extension arms 88 and passageways P1, P2, P3 are exposed by open section 90 of segment 401 (e.g., so that user-selected cables/wires 38, 40 can pass through passageways P1, P2, P3 and out of bracket members 20, 22 for cable management purposes—FIG. 11).

As shown in FIG. 10, the top extension arm 88 can include a locking portion 92 that removably locks/unlocks with door assembly 36 (FIG. 1), and the bottom extension arm 88 can include a hinged portion 93 that allows door assembly 36 to hinge relative thereto.

Figure 8:
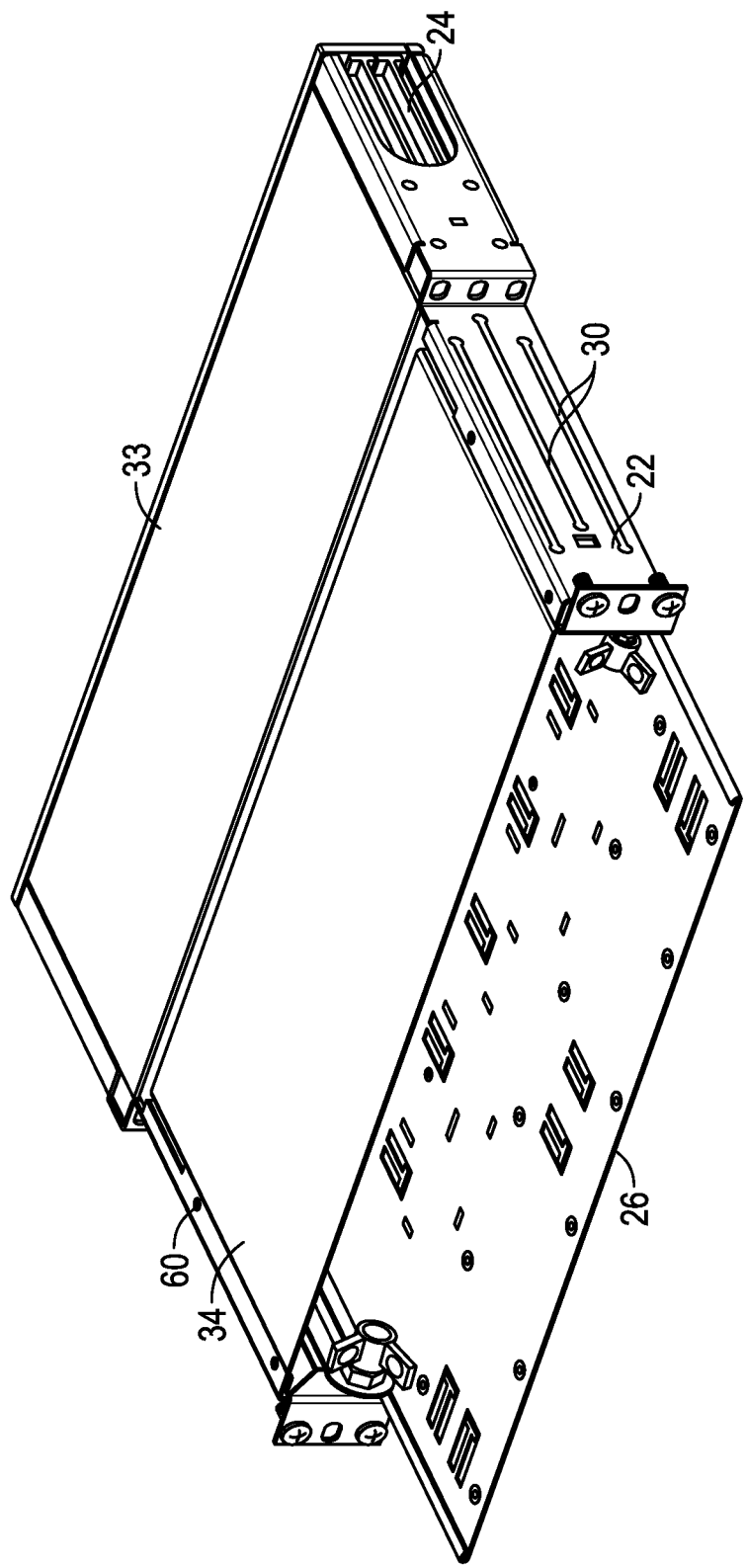
FIG. 8 is a top perspective view of the system of FIG. 1, with front cover member attached.

Cable management member 24 can also include various attachment features for removably securing top cover member 33 (FIG. 8) and/or a front bottom cover member (not shown) to member 24. For example and as shown in FIG. 10, the top and bottom surfaces of member 24 can each include a post member 67 that is configured and dimensioned to mount with respect to a corresponding aperture on top cover member 33 and/or front bottom cover member. Moreover, the top and bottom surfaces of member 24 can each include an aperture 69 that is configured to be mounted/aligned with respect to a corresponding aperture on top cover member 33 and/or front bottom cover member, with a fastener member then positioned through the aligned apertures for securement purposes. In some embodiments, it is noted that top cover member 33 and/or front bottom cover member can be removably mounted with respect to cable management members 24 before the members 24 are removably mounted with respect to bracket members 20, 22, although the present disclosure is not limited thereto. As such, top cover member 33 and/or front bottom cover member can be attached to members 24 as one assembly for easy insertion and removal from rack-mounted bracket members 20, 22. In other embodiments, top cover member 33 and/or front bottom cover member (not shown) are removably mounted to members 24 after members 24 are mounted to brackets 20, 22. With reference to FIGS. 8, 9 and 13, the top flange 68 of segment 402 of bracket members 20, 22 can include one or more protrusion members 60 that extend downward from top flange 68. In general, each protrusion member 60 of top flange 68 is configured and dimensioned to releasably secure to apertures/slots or the like of optional top cover member 34 (FIG. 8).

In another embodiment and as shown in FIG. 17, the top flange 168 of segment 401 of bracket members 20, 22 can include one or more protrusion members 60 that extend downward from top flange 168, and the bottom flange 170 of segment 401 of bracket members 20, 22 can include one or more protrusion members 60 that extend upwards from bottom flange 170. In general, the protrusion members 60 of flanges 168, 170 are configured and dimensioned to releasably secure to apertures/slots or the like of optional top cover member 33 and/or optional front bottom cover member.

Likewise and as shown in FIG. 17, flanges 168, 170 can include one or more apertures 169 that are configured to be mounted/aligned with respect to a corresponding aperture or dimple on top cover member 33 and/or front bottom cover member, with the dimple (or a separate fastener member) then positioned through the aligned apertures/dimples for securement purposes. Similarly and as shown in FIG. 17, the top flange 68 of segment 402 can include one or more apertures 169A that are configured to be mounted/aligned with respect to a corresponding aperture or dimple on top cover member 34, with the dimple (or a separate fastener member) then positioned through the aligned apertures/dimples for securement purposes.

In exemplary embodiments and as discussed above, system 10 provides users with the option of utilizing system 10 as a substantially open frame system 10, or as a semi-enclosed system 10, or as a substantially enclosed system 10. For example, a user may want to mount cover members 33, 34, 35 and 94 to system 10 (and door assembly 36), thereby providing a substantially enclosed system 10 (e.g., for cable management). Alternatively, a user may want to mount one or more of cover members 33, 34, 35 and/or 94 to system 10 thereby providing a semi-enclosed system 10. Likewise, cover members 33, 34, 35 and 94 may not be mounted to system 10 thereby providing a substantially open frame system 10 option to the user. Such flexible modular designs of system 10 advantageously offers the ability for a substantially enclosed system 10 or an open (or semi-open) system 10 without extra parts.

With reference again to FIG. 14 and as discussed above, first segment 401 of bracket member 20, 22 defines the plane of Arrow A, second segment 402 defines the plane of Arrow B, and third segment 403 defines the plane of Arrow C. As noted, exemplary first and second planar segments 401, 402 can be substantially parallel relative to each other and define sides of the media patching system 10.

As such, exemplary bracket members 20, 22 advantageously allow an exemplary panel assembly 12 to be mounted with respect to bracket members 20, 22 and allow panel assembly 12 to be moved or positioned proximally or distally with the side segments 156, 158 of panel assembly 12 substantially travelling or being positioned along plane B of second segments 402 of brackets 20, 22.

Moreover, exemplary bracket members 20, 22 advantageously allow an exemplary cable management member 24 to be mounted with respect to bracket members 20, 22 and allow cable management member 24 to be positioned along plane A of first segments 401 of brackets 20, 22.

In short, the exemplary bracket members 20, 22, each advantageously allows for at least two different planes (plane A and plane B) that have functionality—plane A allows for the cable management member 24 to be utilized for cable management purposes substantially in or along plane A, and plane B allows for the sliding/positioning of a panel assembly substantially in or along plane B (which allows users easy access to the connector assemblies mounted to the panel assemblies). Moreover, plane C (defined by third segment 403) allows for segment 403 to include apertures 23, with each aperture 23 configured to allow bracket member 20, 22 to be mounted with respect to rack 950 (FIG. 13) or the like.

Figure 19:
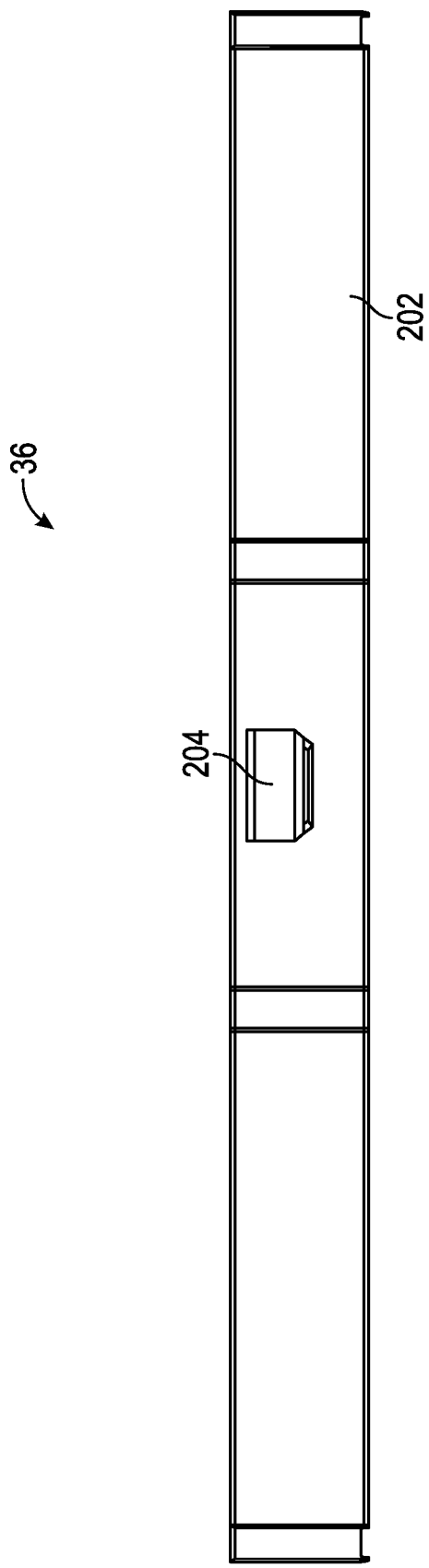
FIG. 19 is a front view of an exemplary door assembly.

FIG. 19 shows a front view of an exemplary door assembly 36 for the front of media patching system 10. Door assembly 36 includes a generally rectangular frame 202. A latch 204 is mounted to the frame 202 in a central location of frame 202. Frame 202 and latch 204 may be made of molded plastic.

Figure 20:
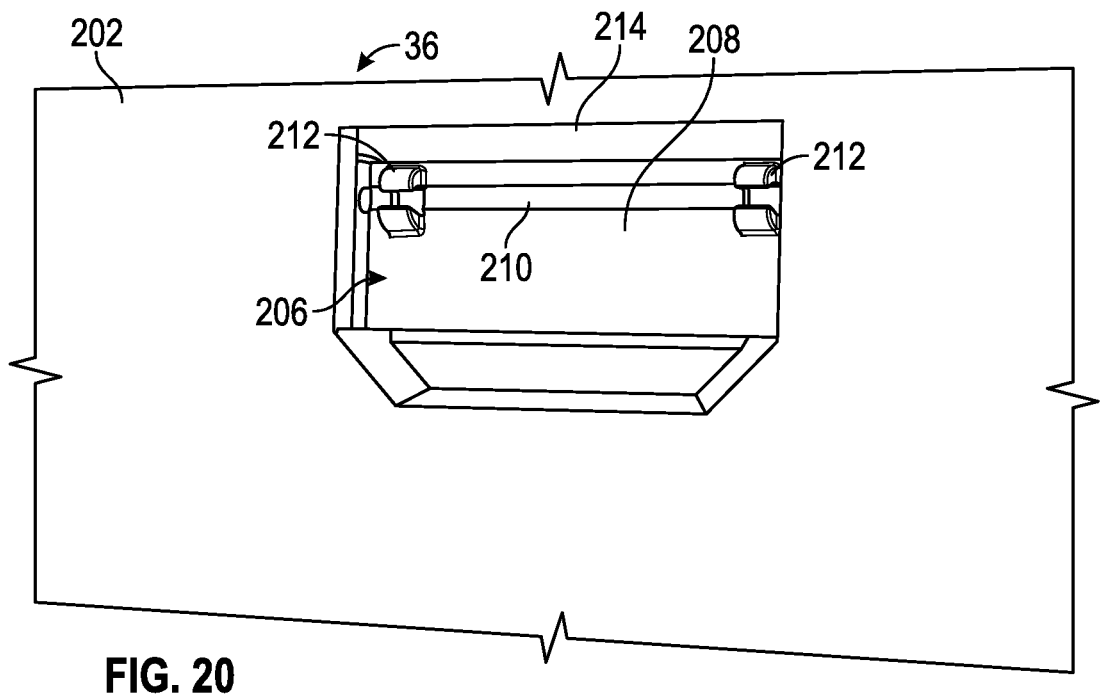
FIG. 20 is a front perspective view of the central part of the door assembly shown in FIG. 19 without the latch installed.

FIG. 20 shows a front perspective view of the central part of frame 202 shown in FIG. 19 without the latch 204 installed. As shown in FIG. 20, the front of frame 202 includes an opening 206. Opening 206 includes a back wall 208. Back wall 208 contains a groove 210 and two hinge supports 212. Back wall does not extend the entire height of the opening 206, thereby creating an open area 214 above back wall 208.

Figure 21:
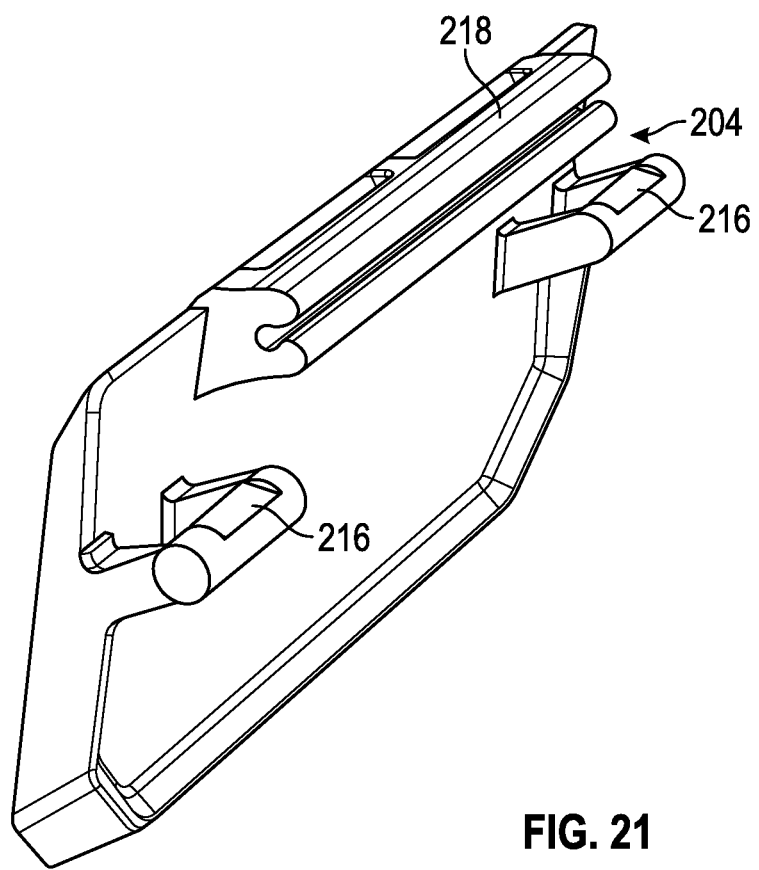
FIG. 21 is a rear perspective view of latch of the door assembly shown in FIG. 19.

FIG. 21 shows a rear perspective view of latch 204. As shown in FIG. 21, two hinge pins 216 extend from the back of latch 204. Hinge pins 216 are inserted into groove 210 at hinge supports 212 to install the latch onto the frame 202. A wire groove 218 also extends from the back of latch 204 above the hinge supports 212. Once installed, latch 204 can rotate about the hinge pins 216. In particular, the bottom of latch 204 can be lifted upward so that it moves away from the back wall 208 of opening 206. When the bottom of the latch 204 is so lifted to rotate the latch about the hinge pins 216, the wire groove 218 on the top rear of the latch rotates rearward and downward. Because the wire groove 218 is located in the open area 214 above the top of the back wall 208, back wall 208 does not prohibit the rearward movement of the wire groove.

Figure 22:
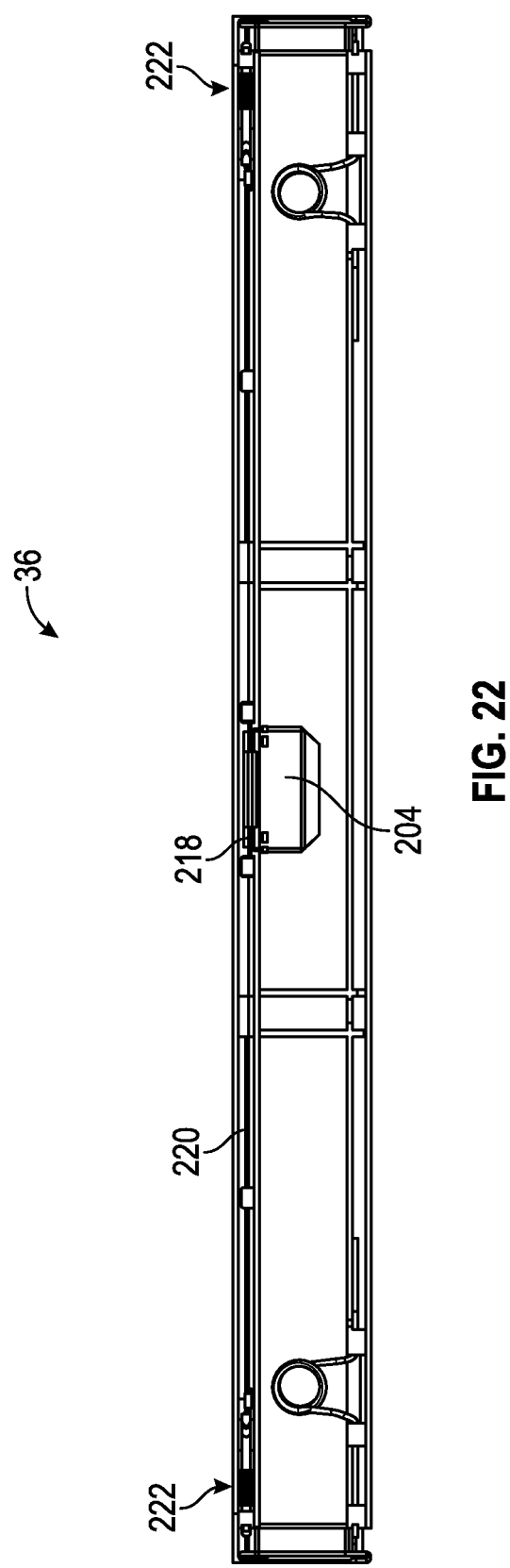
FIG. 22 is a rear view of door assembly shown in FIG. 19.

FIG. 22 shows a rear view of door assembly 36. As shown in FIG. 22, a metal wire or flexible wire cable 220 runs through wire groove 218 on the back of latch 204. Each end of metal wire 220 is connected to a spring-loaded pin mechanism 222. The two spring-loaded pin mechanisms 222, on opposite sides of the rear surface of frame 202, can have the same construction and/or operation, as further discussed below in connection with FIG. 23.

Figure 23:
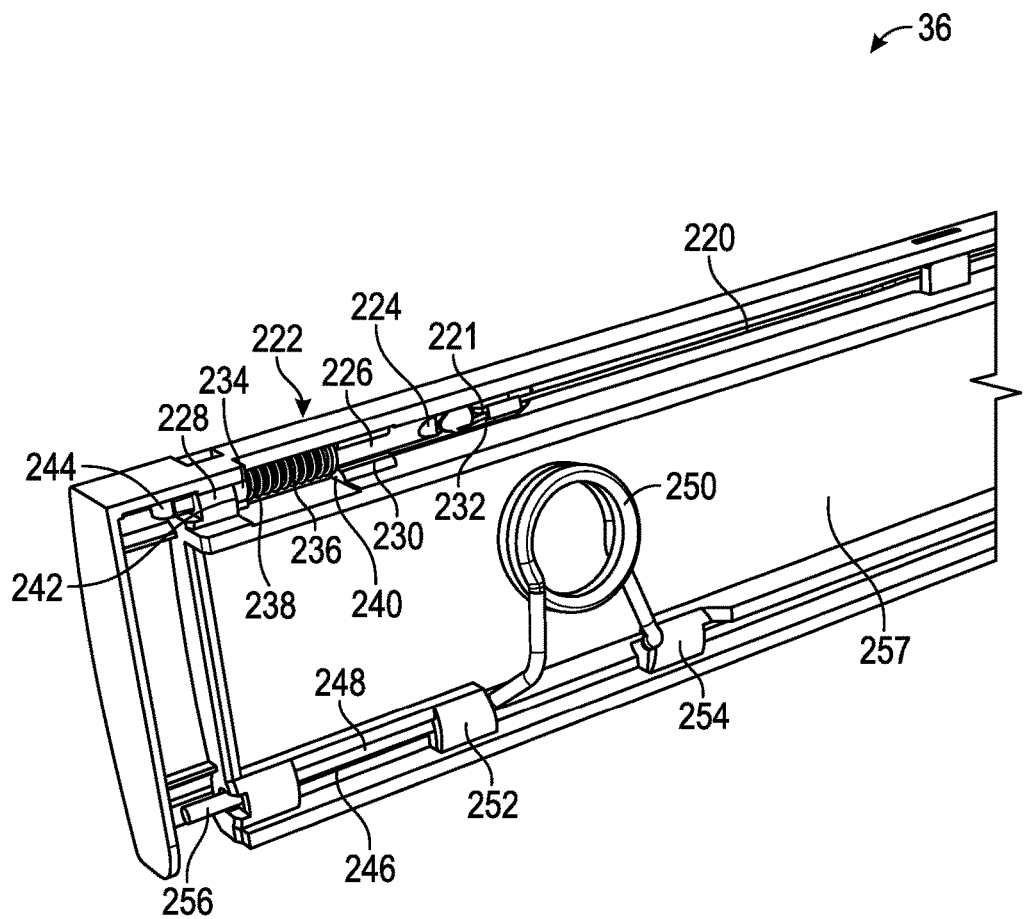
FIG. 23 is a close-up perspective rear-view of one side of the door assembly shown in FIG. 19.

FIG. 23 is a close-up perspective rear-view of one side of door assembly 36. As shown in FIG. 23, the end of wire 220 is connected to spring-loaded pin mechanism 222. In particular, the end of wire 220 includes a loop 221 that is inserted in a slot or hole 224 at the back end of a pin 226. Pin 226 can slide within first and second supports 228, 230, respectively, in a channel 232 in the back of frame 202. Pin 226 includes a large diameter region 234. A compression spring 236 surrounds the pin 226 in between an end surface 238 of the large diameter region 234 and an end surface 240 of support 230. When the pin 226 is in the lock position (shown), the opposite end surface 242 of large diameter region 234 rests against an end surface of support 228. The front end of pin has an angled surface 244, the purpose of which will be described below.

As also shown in FIG. 23, a groove 246 is located on each side of the rear of frame 202 near the bottom of the frame 202. A hinge pin 248 is inserted inside of the groove 246. The hinge pin includes a spring portion 250 that is located between two supports 252, 254 surrounding the hinge pin when it is in the groove 246. The spring portion 250 can be in the form of a torsion spring as is shown in FIG. 23. Hinge pin 248 fits in hinge portion 93 (FIG. 10) in bottom extension member 88 of cable manager member 24 to rotatably mount door assembly 36 to the media patching assembly 10. Hinge pin 248 can be manipulated into the opening in hinge portion 93 by compressing the spring portion 250 to retract end 256 of the pin so that the pin can be positioned so that it is axially aligned with the opening in hinge portion 93 and then releasing the spring portion 250 to move the end 256 of the pin into the opening in hinge portion 93. Similarly, door assembly 36 can be removed from the fingers by compressing the spring portion 250 to retract end 256 of the pin from the opening in hinge portion 93. A label card 257 can be inserted between the door frame and the spring portion 250 of the hinge pin.

The operation of the door-release mechanism is as follows. When the lower portion of latch 204 is lifted so that it moves away from the back wall 208 of the opening 206, the latch 204 rotates about the hinge pins 214. This rotation causes wire/cable groove 218 to move rearward so that it pulls on the portion of metal wire 220 that runs through the wire groove 218. This pulling of metal cable 220 causes each end of metal cable 220 to pull the pin 226 it is connected to against the force of spring 236. This causes pin end 244 to retract so that it is no longer inside of locking portion 92 of top extension member 88 of cable manager member 24 (FIG. 10). When pin end 244 is in this retracted position, door 36 can be rotated downward about hinge pins 248 (FIG. 24).

When latch 204 is released, spring 236 pushes the pins 226 back to their rest position, since cable 220 no longer exerts a force on the pin 226 in the opposite direction. Once open, the door assembly 36 can be closed and locked without manipulation of the latch 204. In particular, as the door 36 is rotated rearward towards the cable managers 24 to close it, the pin 226 will initially be blocked by locking portion 92. But because pin 226 has an angled end surface 244, it will retract as the door 36 continues to close against the force of spring 236. Pin 226 will eventually line up with the opening in locking portion 92 at which point spring 236 will push pin 226 to its locking (rest) position within the opening in locking portion 92.

Figure 24:
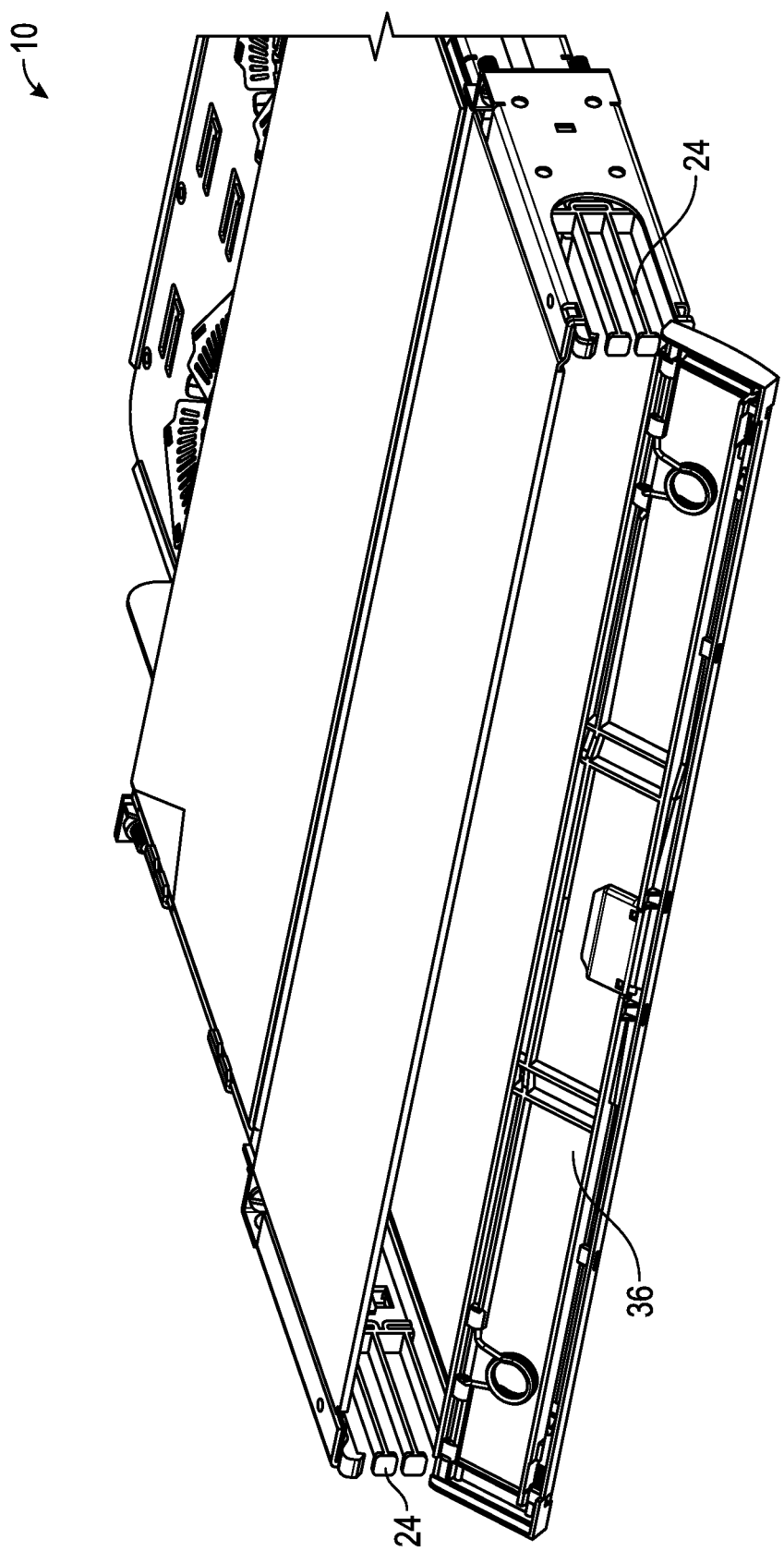
FIG. 24 shows an exemplary door assembly mounted to an exemplary media patching system, the door assembly being moved to an open position.

FIG. 24 shows an exemplary door assembly 36 mounted to an exemplary media patching system 10, the door assembly 36 being moved to an open position.

In another embodiment and with reference to FIG. 23, it is noted that instead of having wire 220 with loop 221 being separate parts or pieces relative to: (i) pin 226 with angled surface 224, and (ii) relative to spring 236, one could combine the wire 220 (and/or loop 221), the locking pin 226, and the spring 236 into a single or integral part (e.g., a single plastic part). By moving this single part downward (or inward) with the latch 204, the arms of the single part would act as the spring 236, and the ends of the single part (acting as the pin 226) would retract, allowing the door 36 to be opened (e.g., the single part would act or function like a leaf spring, and without the need for spring 236).

Figure 25:
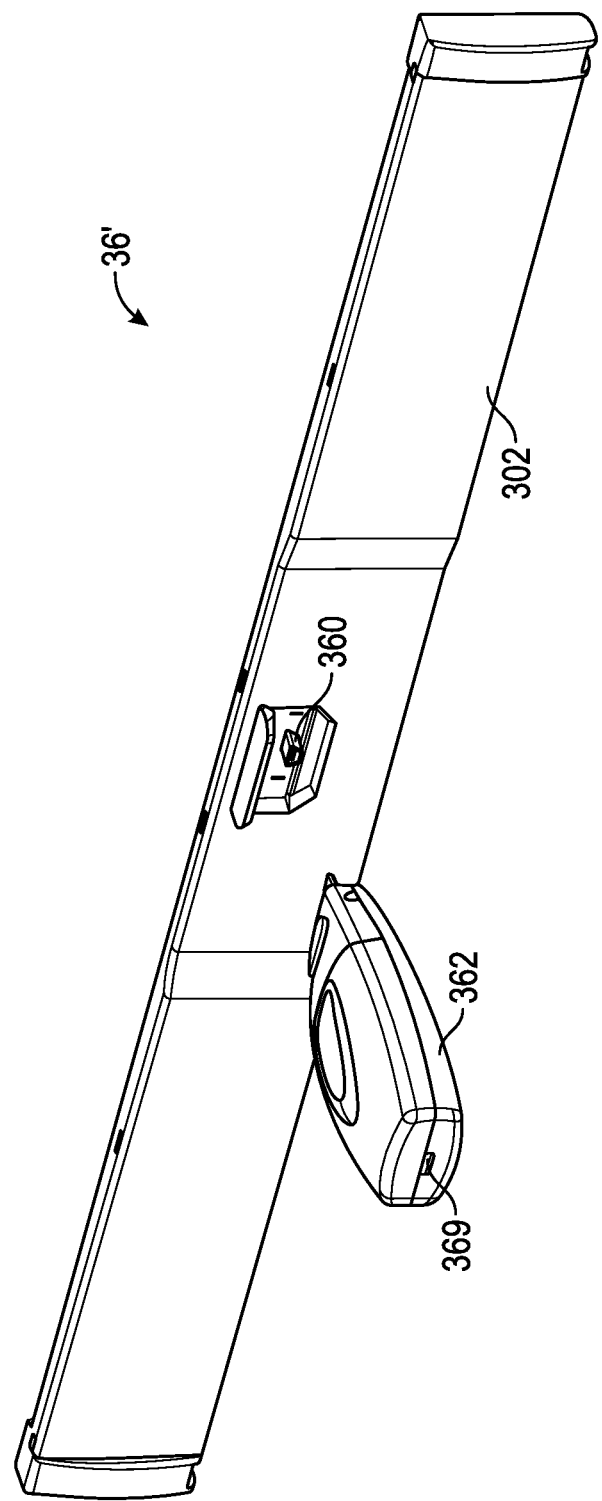
FIG. 25 is a front perspective view of another exemplary door assembly with an electronic key also shown.

FIG. 25 is a front perspective view of another exemplary door assembly 36'. Door assembly 36' includes the same spring-loaded pin mechanism 222 in door assembly 36 as shown in FIGS. 22-23, but, as described in more detail below, in door assembly 36' the wire 382 between the spring-loaded pin mechanisms 222 is made of a shape-memory alloy (e.g., nickel/titanium SMA alloy) and is constructed such that it contracts when an electrical current passes through it and returns back to original length when the current ceases to flow through it.

As shown in FIG. 25, instead of the latch 204 in door mechanism 36, the central region of the front of frame 302 of door assembly 36' has a standardized data receptacle 360. Receptacle 360 can be any type that is capable of making a point-to-point data connection as well as a limited power connection. Examples for receptacle 360 include a USB receptacle and a MicroUSB receptacle. The receptacle 360 can receive a corresponding connector on a key 362.

Figure 26:
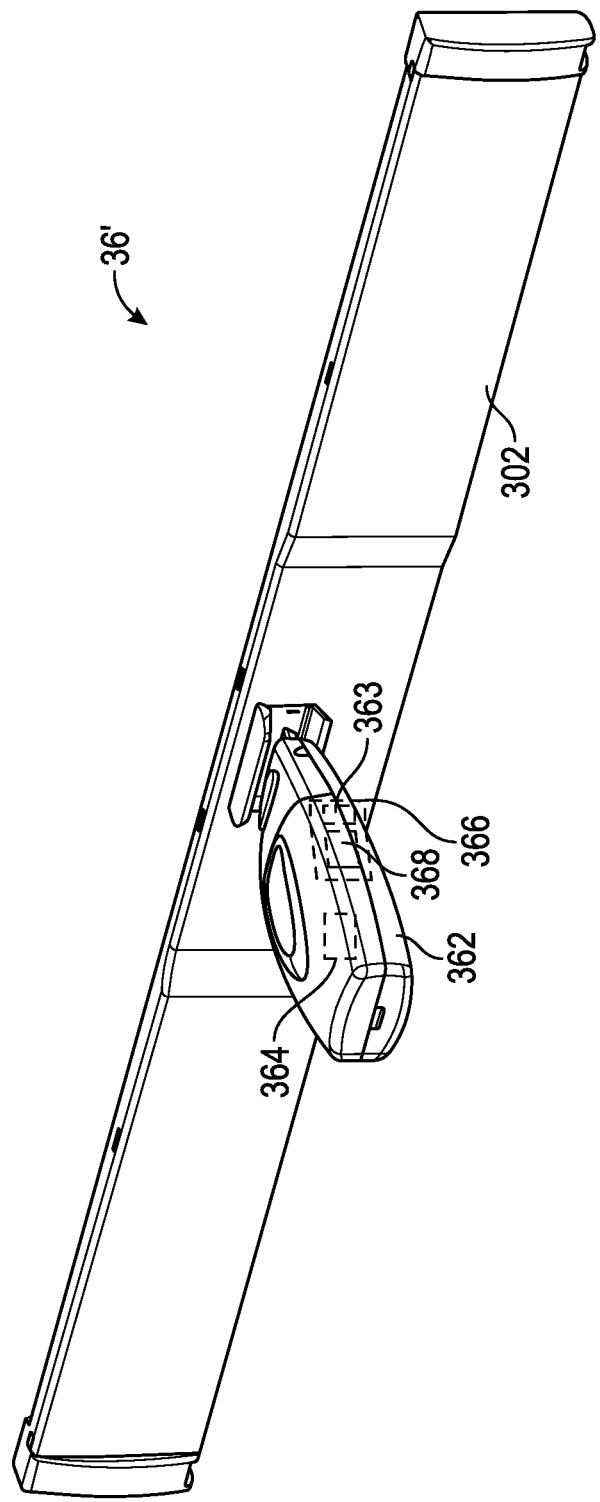
FIG. 26 is a front perspective view of the door assembly shown in FIG. 25 with the key inserted.

FIG. 26 is a front perspective view of the door assembly shown in FIG. 25 with the key 362 inserted (e.g., into receptacle 360). Key 362 includes a power source, such as a rechargeable battery 364. Key 362 also includes a PCB or circuit board 366 with a mounted DIP (dual inline package) switch 368. The power source 364 and the DIP switches will be described in more detail below.

Key 362 also contains a microprocessor or MPU 363 with program or firmware that determines if there is a code match between DIP switch 368 of key 362 and DIP switch 372 of circuit board 370 and then enables the current flow to the SMA wire 382 if the switch 368, 372 settings match, as discussed further below.

Figure 27:
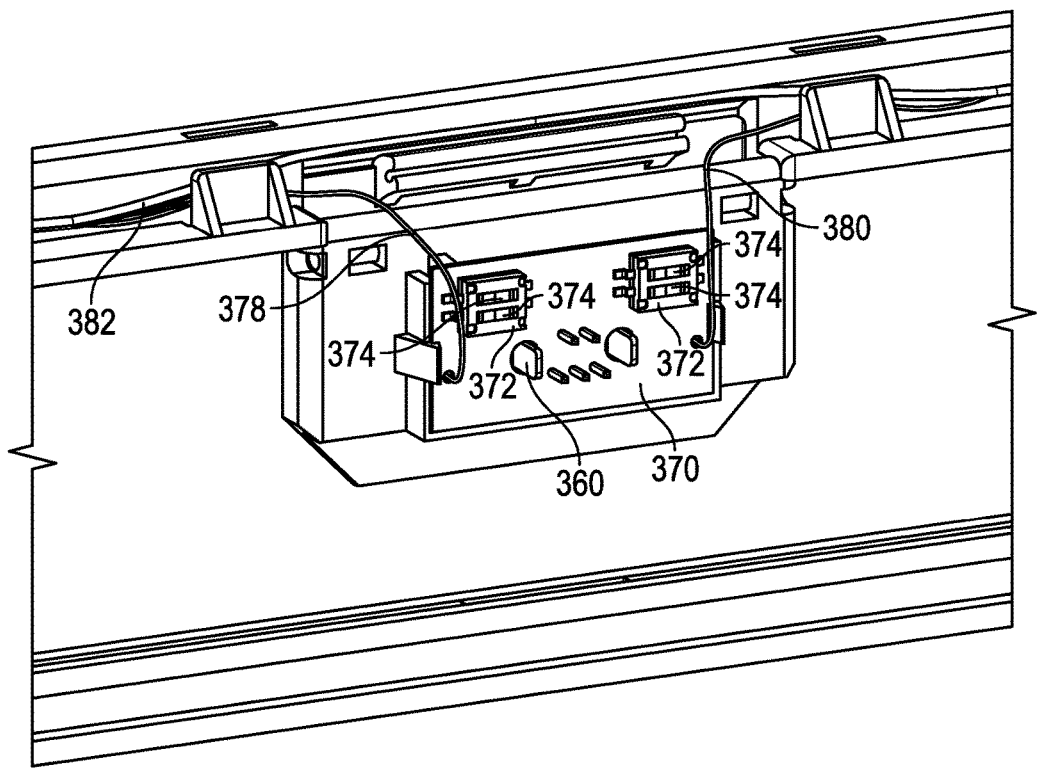
FIG. 27 is a rear perspective view of the central region of the door assembly shown in FIG. 25.

FIG. 27 is a rear perspective view of the central region of the door assembly 36'. As shown in FIG. 27, the central region of the rear of the door assembly 36' supports a printed circuit board 370. Receptacle 360 is attached to the circuit board 370 and passes through an opening in the frame 302 so that it is accessible from the front of the frame 302.

One or more DIP switches 372 are also attached to the circuit board 370. In exemplary embodiments, the DIP switch or switches 372 include four individual on-off switches 374. For example, PCB 370 can include two separate switch pieces 372, with each switch piece 372 having two on-off switches 374 (e.g., to allow for the central mounting of the receptacle 360 on PCB 370). However, it should be understood that a DIP switch or switches 372 having any number of on-off switches 374 can be used.

Figure 28:
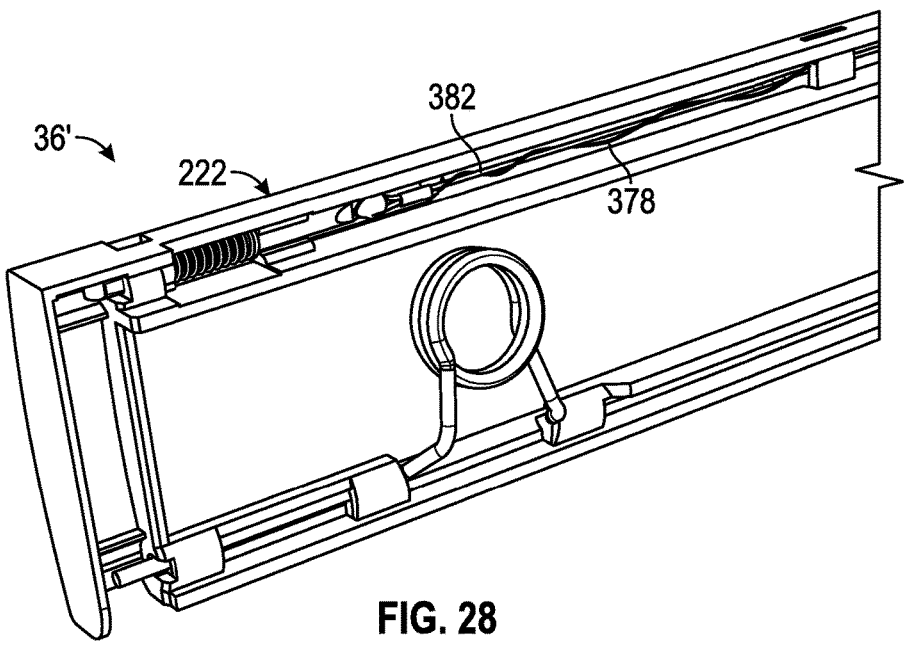
FIG. 28 is a close-up perspective rear-view of one side of the door assembly shown in FIG. 25.

One end on each of two wires 378, 380 is also connected to circuit board 370. The opposite ends of wires 378, 380 are electrically connected to the shape-memory-alloy wire 382 (FIG. 28). Each wire 378, 380 is electrically connected to an opposite end of the shape-memory-alloy wire 382, near the location where the shape-memory-alloy wire 382 is connected to the spring-loaded pin mechanism 222 (FIG. 28). FIG. 28 is a close-up perspective rear-view of one side of the door assembly 36' shown in FIG. 25.

The MPU 363 on the circuit board 366 inside the key 362 and the circuit board 370 on the rear of door assembly 36' are configured such that if the DIP switch 368 in the key 362 has the same setting as the DIP switch 372 on the board 370, an electric circuit powered by the battery 364 inside of the key 362 is completed by the MPU 363. The circuit includes wire 378, shape-memory alloy wire 382, and wire 380 connected in series, with the shape-memory allow wire 382 acting as a resistor. The current flow through this circuit causes the shape-memory alloy wire 382 to contract, actuating the spring-loaded pin mechanisms 222 to unlock the door 36'. When the key 362 is removed, the circuit is broken. When current ceases to flow in shape-memory alloy wire 382, it returns to its original length. If DIP switch 368 in key 362 does not have the same setting as the DIP switch 372 on the board 370, the MPU 363 does not enable the current flow through the shape-memory alloy wire 382.

As noted, the key 362 contains a microprocessor chip or MPU 363 that reads the state of the DIP switch 372 (or switches 372) located on the door PCB 370 (through the micro USB connection) and determines if it matches the DIP switch 368 setting on the key 362. If the DIP switch 368, 372 settings match, then the microprocessor 363 enables a transistor/MOSFET current driver combination circuit that produces a current sufficient to actuate the SMA wire 382. There is also a low battery indicator circuit and a voltage step up charging circuit (capacitor and coil network) so that the 5 VDC from a standard USB power source can be stepped up to allow charging of the 9 volt lithium battery 364 contained in the key 362. As shown in FIG. 25, key 362 includes a re-charging port 369.

The key 362 electronic circuit and the door 36' electronic circuit are shown in FIGS. 31 and 32A-32C.

The SMA wire 382 is typically 250 microns in diameter and about 15 inches long. It can have a resistance of about 18.5 ohm/cm. The pull force is about 891 grams for this size SMA wire 382. However, this system could work with other diameter SMA wires and lengths that would provide different pull forces. Exemplary length deformation for the SMA wire 382 is 3% to 5%. An exemplary current for this wire 382 to actuate is 1050 mA, however since the battery 364 discharges over time with multiple actuations of the electronic lock, its voltage may drop off somewhat through repeated uses. Therefore the SMA wire 382 needs to actuate at a lower voltage/current—roughly 8.5 volts and 750 mA. When the battery 364 starts to become depleted, it can take longer for the SMA wire 382 to heat up and therefore to actuate the spring loaded pin mechanism 222 to open the door 36' until it is unable to provide enough current to the SMA wire 382. Somewhat before that point the MPU chip 363 senses a low battery voltage and activates an indicator (e.g., red LED indicator) on the key 362.

Figure 29:
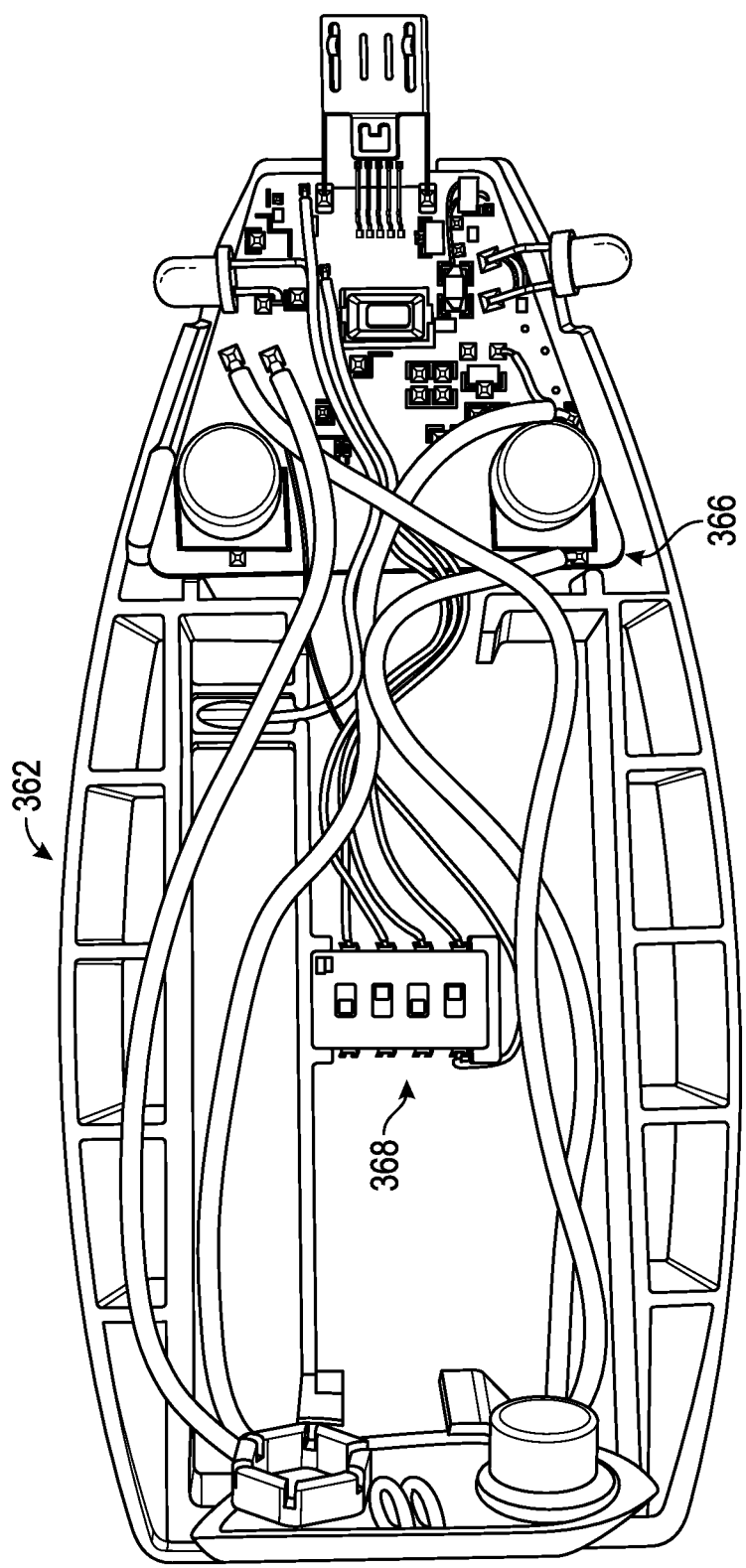
FIGS. 29-30 show internal components of an exemplary key for use with the door assembly of FIG. 25.
Figure 30:
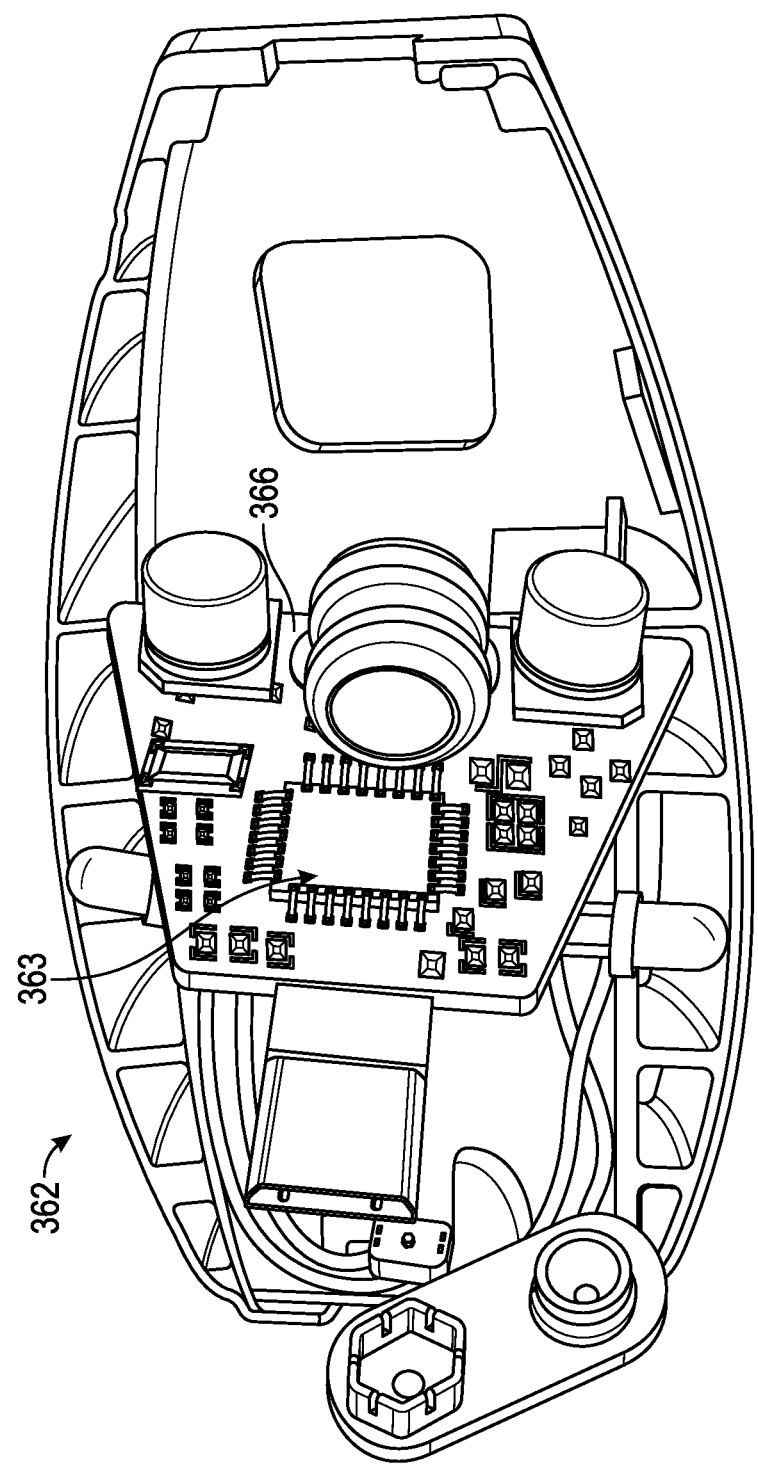

FIGS. 29-30 show internal components of an exemplary key 362 for use with door assembly 36'.

Figure 31:
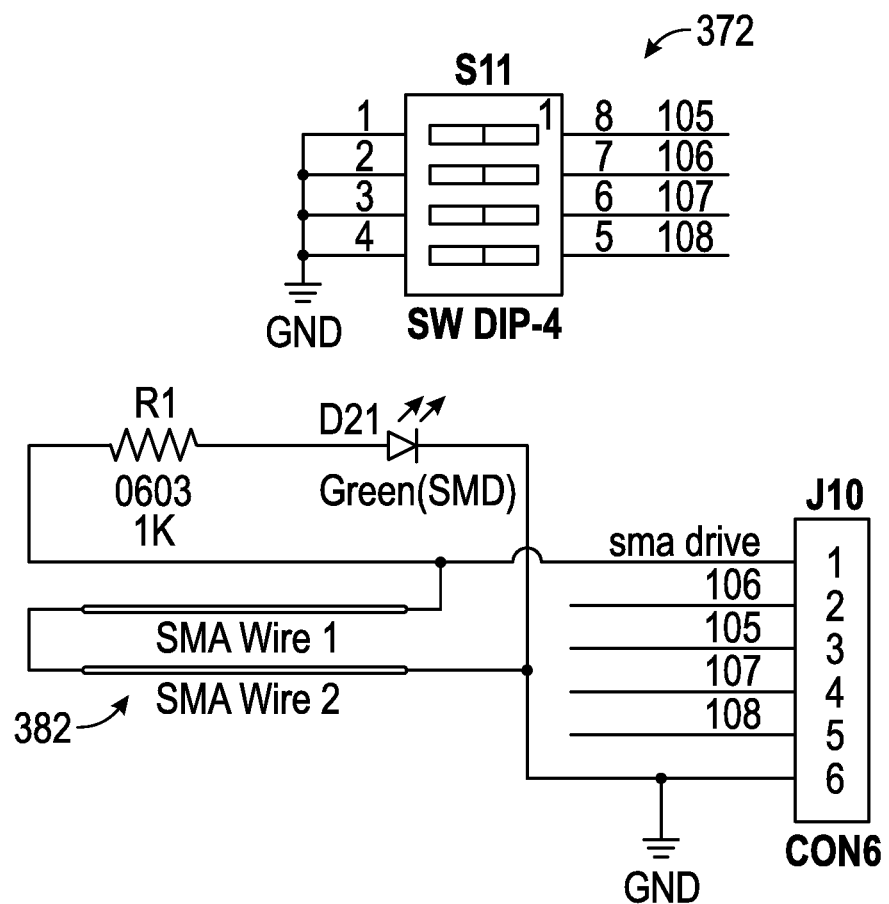
FIG. 31 shows a schematic of exemplary circuitry included in the door assembly of FIG. 25.
Figure 32A:
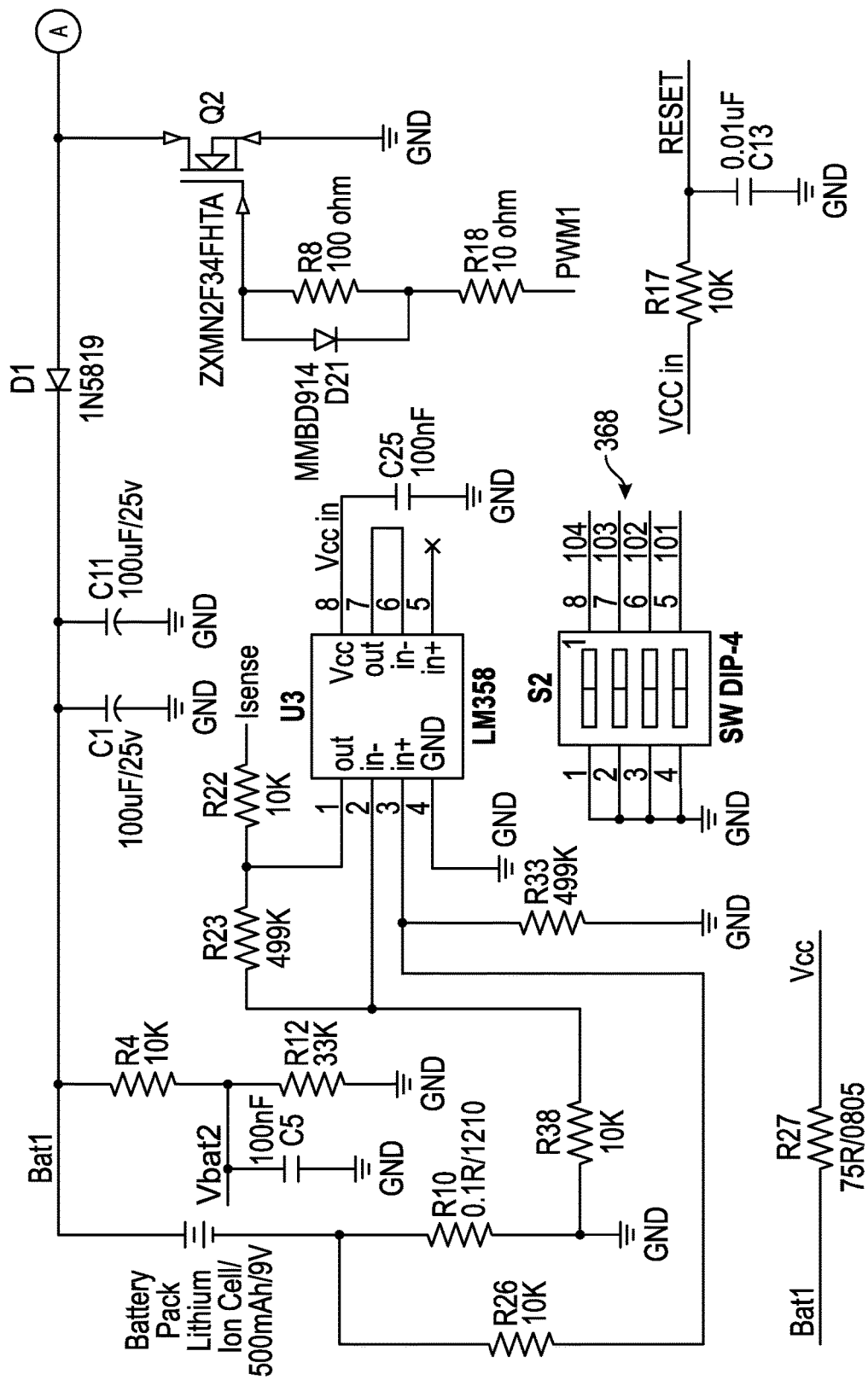
FIGS. 32A-32C show a schematic of exemplary circuitry included in the exemplary key of FIG. 25.
Figure 32B:
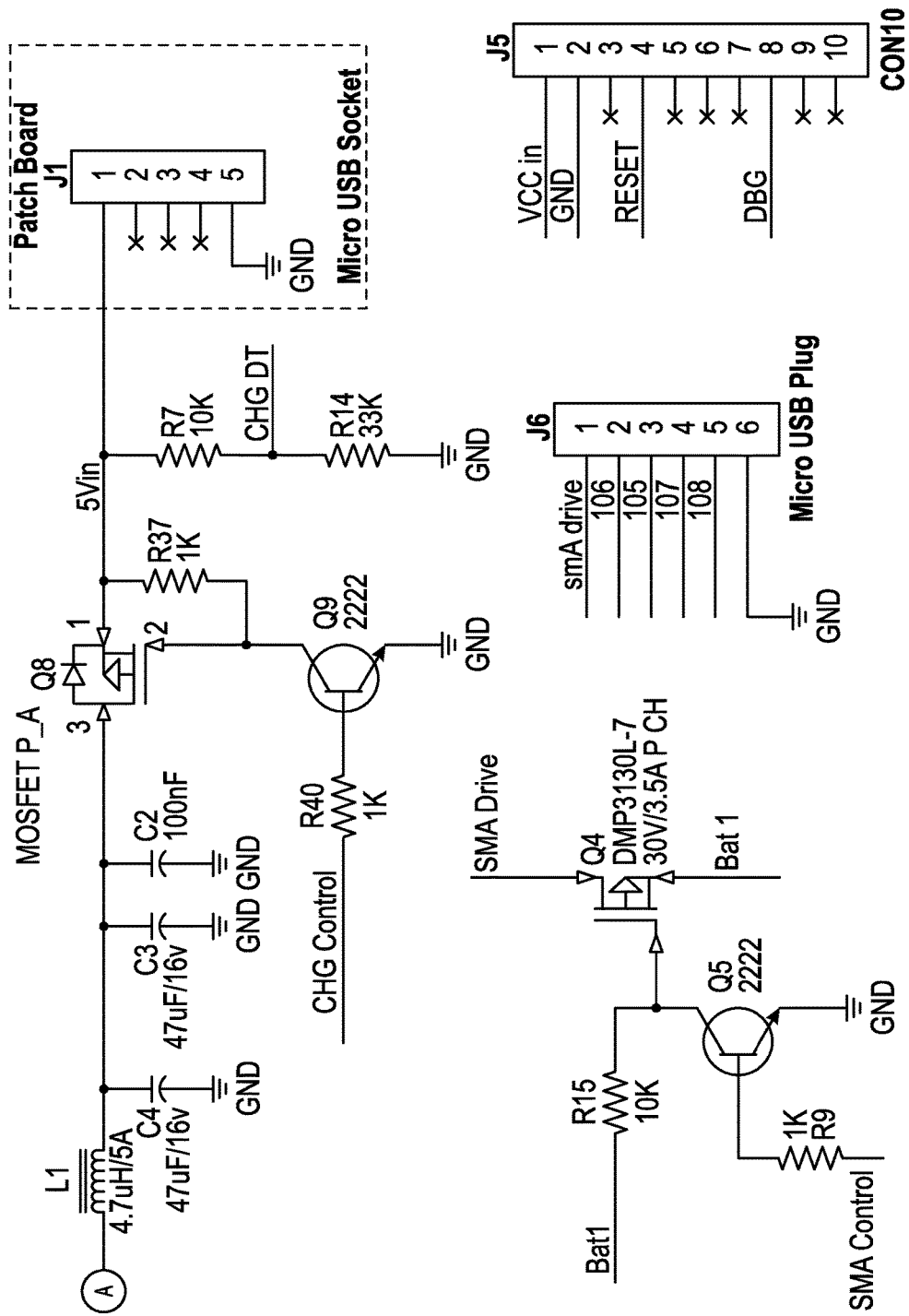
Figure 32C:
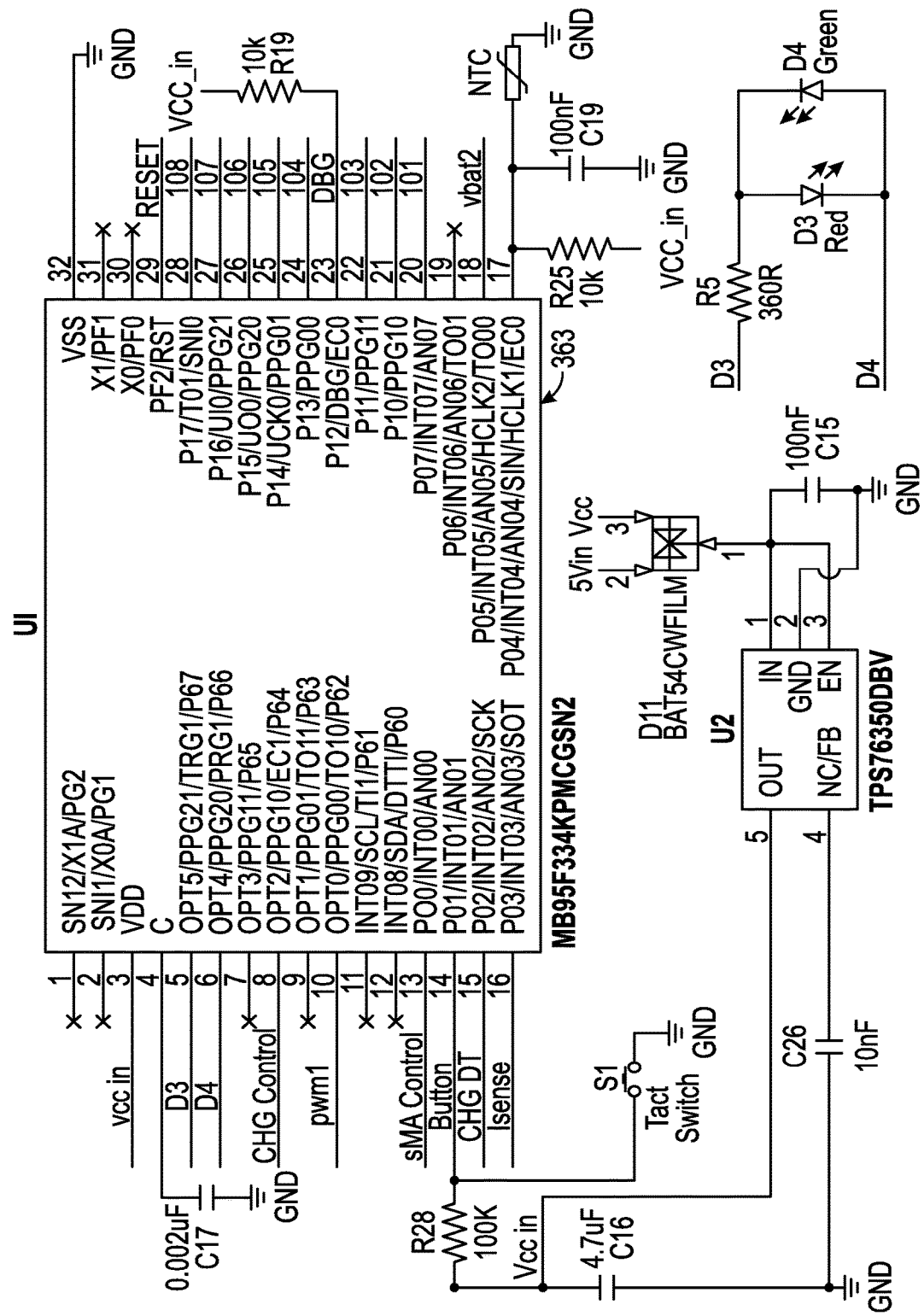

FIG. 31 shows a schematic of exemplary circuitry included in door assembly 36', and FIGS. 32A-32C show a schematic of exemplary circuitry included in exemplary key 362.

Figure 33:
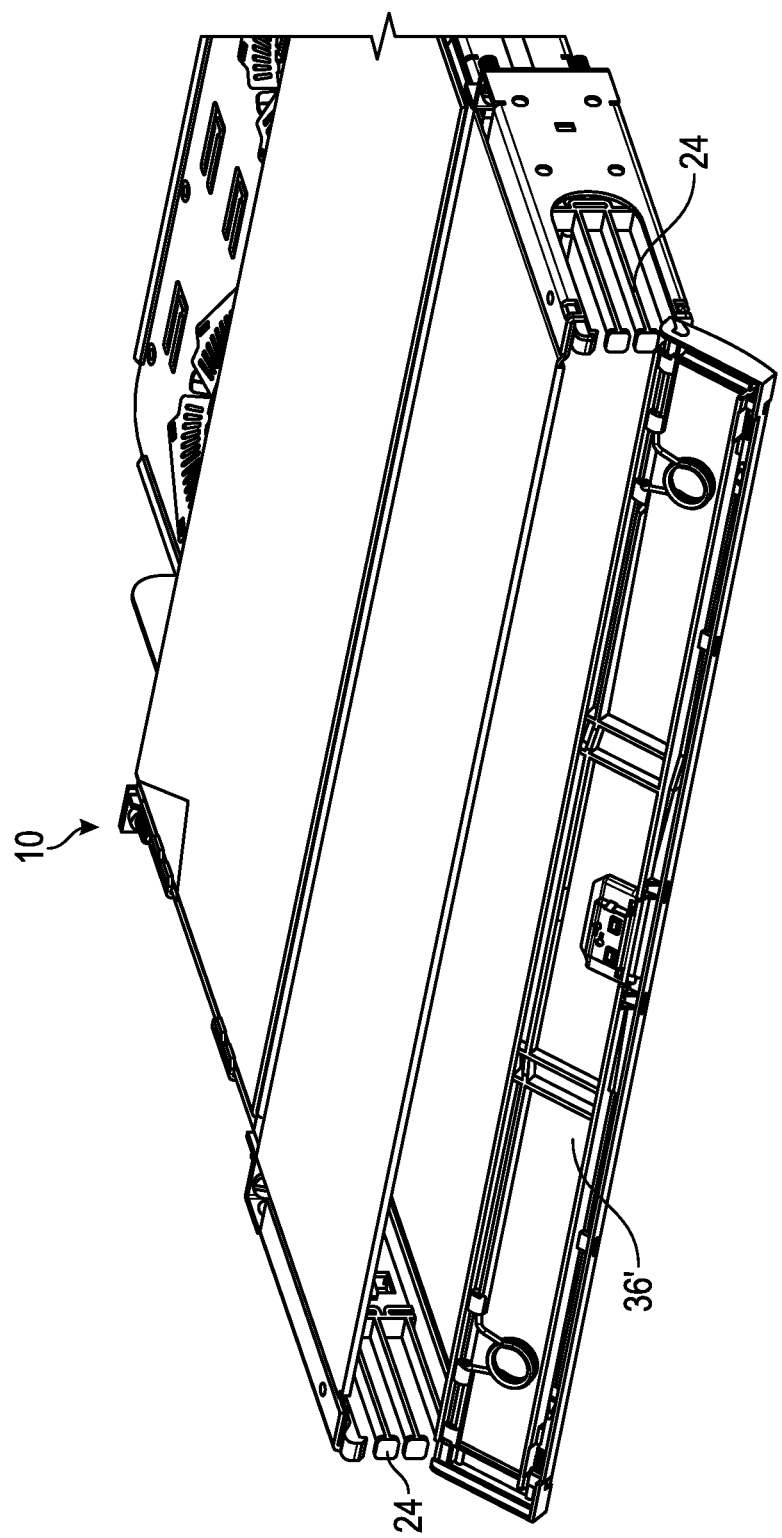
FIG. 33 shows another exemplary door assembly mounted to an exemplary media patching system, the door assembly being moved to an open position.

FIG. 33 shows exemplary door assembly 36' mounted to an exemplary media patching system 10, the door assembly 36' being moved to an open position.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A media management system comprising:
a first bracket member and a second bracket member, the first bracket member configured to releasably mount to a first cable management member and the second bracket member configured to releasably mount to a second cable management member, the first and second cable management members configured to manage media cables; and
a door assembly having a frame extending from a first end to a second end, the first end configured to releasably mount to the first cable management member, and the second end configured to releasably mount to the second cable management member;

wherein the releasably mounted first and second ends allow the door assembly to move relative to the first and second bracket members between a closed position and an open position and vice-versa;

wherein the first end of the frame includes a first hinge pin, the first hinge pin configured to be releasably mounted to a first bottom extension member of the first cable management member; and wherein the second end of the frame includes a second hinge pin, the second hinge pin configured to be releasably mounted to a second bottom extension member of the second cable management member;

wherein the first hinge pin is positioned within a first groove of the first end of the frame, and the second hinge pin is positioned within a second groove of the second end of the frame.

2. The system of claim 1, wherein the first hinge pin is configured to be rotatably mounted to a first hinge portion of the first bottom extension member, and the second hinge pin is configured to be rotatably mounted to a second hinge portion of the second bottom extension member.

3. The system of claim 1, wherein the first hinge pin includes a first spring portion that is configured to be compressed by a user to retract and release the first hinge pin from the first bottom extension member; and wherein the second hinge pin includes a second spring portion that is configured to be compressed by a user to retract and release the second hinge pin from the second bottom extension member.

4. A media management system comprising:

a first bracket member and a second bracket member, the first bracket member configured to releasably mount to a first cable management member and the second bracket member configured to releasably mount to a second cable management member, the first and second cable management members configured to manage media cables; and a door assembly having a frame extending from a first end to a second end, the first end configured to releasably mount to the first cable management member, and the second end configured to releasably mount to the second cable management member;

wherein the releasably mounted first and second ends allow the door assembly to move relative to the first and second bracket members between a closed position and an open position and vice-versa;

wherein the frame includes a wire that extends from a first end to a second end, the first end of the wire mounted to a first spring-loaded pin mechanism and the second end of the wire mounted to a second spring-loaded pin mechanism; and wherein the first spring-loaded pin mechanism includes a first pin configured to be releasably mounted to a first top extension member of the first cable management member, and the second spring-loaded pin mechanism includes a second pin configured to be releasably mounted to a second top extension member of the second cable management member.

5. The system of claim 4, wherein the first pin is configured to be releasably mounted to a first locking portion of the first top extension member, and the second pin is configured to be releasably mounted to a second locking portion of the second top extension member.

6. The system of claim 4, wherein the first end of the wire includes a first loop that is mounted to a slot or hole of the first pin, and the second end of the wire includes a second loop that is mounted to a slot or hole of the second pin.

7. The system of claim 4, wherein the first spring-loaded pin mechanism includes a first spring that is configured to be compressed by a user to retract and release the first pin from the first top extension member; and wherein the second spring-loaded pin mechanism includes a second spring that is configured to be compressed by a user to retract and release the second pin from the second top extension member.

8. The system of claim 7, wherein the first spring surrounds a portion of the first pin, and the second spring surrounds a portion of the second pin.

9. The system of claim 7, wherein the door assembly includes a latch configured to be releasably and movably mounted to the frame, the latch including a groove that houses a portion of the wire; and wherein when the latch is moved upwardly by a user, this movement causes the wire to compress the first and second springs and also retract and release the first and second pins from the first and second top extension members, respectively.

10. The system of claim 9, wherein the latch includes a hinge pin configured to be positioned within a mounting groove of the frame to releasably and movably mount the latch to the frame.

11. The system of claim 4, wherein the wire is fabricated from a shape-memory alloy, the wire configured to contract when an electrical current passes through the wire and return back to original length when the current ceases to flow through the wire.

12. The system of claim 11, wherein when the wire contracts when an electrical current passes through the wire, this contraction causes the wire to compress the first and second springs and also retract and release the first and second pins from the first and second top extension members, respectively.

13. The system of claim 12, wherein a key electrically connected to the frame is configured to cause an electrical current to pass through the wire.

14. The system of claim 13, wherein the key includes a first circuit board, a microprocessor and a first dual inline package switch;

wherein the frame includes a second circuit board, a second dual inline package switch and at least one circuit wire connected to the second circuit board and electrically connected to the wire; and wherein when the key is mounted to the frame, the microprocessor of the key determines if there is a code match between the first and second dual inline package switches and then enables current flow to the wire if the first and second dual inline package switches match.

15. The system of claim 14, wherein the first and second dual inline package switches each include four individual on-off switches.

16. The system of claim 12, wherein the key is connected to the frame via a USB receptacle.

17. A media patching system comprising:

a panel assembly having a front panel segment, the front panel segment having a plurality of apertures with each aperture configured to mount to a media connector assembly;

a first bracket member and a second bracket member, the first bracket member configured to releasably mount to a first cable management member and the second bracket member configured to releasably mount to a second cable management member, the first and second cable management members configured to manage media cables;

a door assembly having a frame extending from a first end to a second end, the first end configured to releasably mount to the first cable management member, and the second end configured to releasably mount to the second cable management member;

wherein the releasably mounted first and second ends allow the door assembly to move relative to the first and second bracket members between a closed position and an open position and vice-versa;

wherein the panel assembly is movably mounted to the first and second bracket members and can move axially forwards or backwards relative to the first and second bracket members;

wherein the first end of the frame includes a first hinge pin, the first hinge pin configured to be releasably mounted to a first bottom extension member of the first cable management member; and wherein the second end of the frame includes a second hinge pin, the second hinge pin configured to be releasably mounted to a second bottom extension member of the second cable management member;

wherein the first hinge pin includes a first spring portion that is configured to be compressed by a user to retract and release the first hinge pin from the first bottom extension member; and wherein the second hinge pin includes a second spring portion that is configured to be compressed by a user to retract and release the second hinge pin from the second bottom extension member.

18. A media management system comprising:

a first bracket member and a second bracket member;

a first cable management member and a second cable management member, the first and second cable management members configured to manage media cables;

a door assembly having a frame extending from a first end to a second end;

means for releasably mounting: (i) the first cable management member to the first bracket member, and (ii) the second cable management member to the second bracket member; and means for releasably mounting: (i) the first end of the frame to the first cable management member, and (ii) the second end of the frame to the second cable management member;

wherein the releasably mounted first and second ends allow the door assembly to move relative to the first and second bracket members between a closed position and an open position and vice-versa;

wherein the frame includes a wire that extends from a first end to a second end, the first end of the wire mounted to a first spring-loaded pin mechanism and the second end of the wire mounted to a second spring-loaded pin mechanism; and wherein the first spring-loaded pin mechanism includes a first pin configured to be releasably mounted to a first top extension member of the first cable management member, and the second spring-loaded pin mechanism includes a second pin configured to be releasably mounted to a second top extension member of the second cable management member.

* * * * *